(12) United States Patent
Druker et al.

(10) Patent No.: US 12,707,134 B2
(45) Date of Patent: Aug. 11, 2026

(54) COUPLERS FOR IMAGE CAPTURE DEVICES AND ACCESSORIES

(71) Applicant: GoPro, Inc., San Mateo, CA (US)

(72) Inventors: Joshua Todd Druker, Redwood City, CA (US); James Walton, La Honda, CA (US); Jesse Frost Patterson, Pacifica, CA (US); Matthew David Thomas, Castro Valley, CA (US); Jonathan Stern, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 18/851,332

(22) PCT Filed: Dec. 7, 2022

(86) PCT No.: PCT/US2022/052141

§ 371 (c)(1),
(2) Date: Sep. 26, 2024

(87) PCT Pub. No.: WO2023/191857

PCT Pub. Date: Oct. 5, 2023

(65) Prior Publication Data

US 2025/0080814 A1 Mar. 6, 2025

Related U.S. Application Data

(60) Provisional application No. 63/324,892, filed on Mar. 29, 2022.

(51) Int. Cl.
*H04N 23/51* (2023.01)
*F16B 21/16* (2006.01)

(52) U.S. Cl.
CPC ............. *H04N 23/51* (2023.01); *F16B 21/16* (2013.01)

(58) Field of Classification Search
CPC .......... F16B 2/185; F16B 21/04; F16B 21/16; F16M 11/041; F16M 11/10; F16M 11/16;
(Continued)

(56) References Cited

U.S. PATENT DOCUMENTS 9,377,672 B1 6/2016 Clearman
9,778,548 B2 10/2017 Achenbach
(Continued)

OTHER PUBLICATIONS

International Search Report and Written Opinion issued in App. No. PCT/US22/52141, mailing date May 3, 2023, 20 pages.

*Primary Examiner* — Antoinette T Spinks
(74) *Attorney, Agent, or Firm* — Young Basile Hanlon & MacFarlane, P.C.

(57) ABSTRACT

A coupler (mount) is disclosed that is configured to releasably connect an image capture device and an accessory. The coupler includes a shaft and a lever that is operatively connected to the shaft, and is repositionable between unlocked and locked positions as well as between disengaged and engaged positions. When the coupler is in the unlocked positioned, the image capture device and the accessory are movable in relation to each other, and when the coupler is in the locked positioned, the image capture device and the accessory are fixed in relation to each other. When the coupler is in the disengaged position, the shaft is removable from the image capture device and the accessory, and when the coupler is in the engaged position, the shaft is non-removable from the image capture device and the accessory.

15 Claims, 12 Drawing Sheets

(58) Field of Classification Search
CPC ............. F16M 13/04; F16M 2200/022; G03B 17/561; G03B 17/566; H04N 23/51
See application file for complete search history.

(56) References Cited

U.S. PATENT DOCUMENTS

| | | | | |
|---|---|---|---|---|
| 2002/0150397 | A1* | 10/2002 | Sangregory | G03B 17/566 396/6 |
| 2005/0276658 | A1 | 12/2005 | Silva | |
| 2016/0116828 | A1* | 4/2016 | Clearman | G03B 17/566 396/428 |
| 2019/0369466 | A1* | 12/2019 | Clearman | H04N 23/50 |
| 2020/0240574 | A1 | 7/2020 | Liu | |
| 2021/0186316 | A1* | 6/2021 | Thommen | A61B 1/051 |
| 2022/0265134 | A1* | 8/2022 | Thommen | A61B 17/0293 |
| 2024/0201569 | A1* | 6/2024 | Nguyen | G03B 17/14 |
| 2024/0272527 | A1* | 8/2024 | Wong | G03B 17/561 |
| 2025/0291237 | A1* | 9/2025 | Feddersen | G03B 17/561 |
| 2025/0294230 | A1* | 9/2025 | Vitale | H04N 23/57 |

* cited by examiner 400
402
424
416
404
14i
14ii
14iii
10
L
XL
α
410
424
412
408
500
XS
22mii
12

400
10
2
402
β
500
XR/XS
22mii
408

400
402
408
10
16
11
11
18
20i
14i
20ii
14ii
500
12
14iii
22mii 408
1
442
450
448
446
444
442
440
448
450
440
444
434
XS 504
500
434
440
408
502
510
3
440
442
XR/XS 440
434
504
500
440
408
502
442

100
1204
1206
1220
1200

100
1204
1220
1200
1206

100
1304
1302
1300

COUPLERS FOR IMAGE CAPTURE DEVICES AND ACCESSORIES

CROSS-REFERENCE TO RELATED APPLICATIONS

This application is a 371 of International Patent Application No. PCT/US2022/052141, filed Dec. 7, 2022, which claims the benefit of and priority to U.S. Provisional Patent Application Ser. No. 63/324,892, filed Mar. 29, 2022, the entire contents of which are hereby incorporated by reference.

TECHNICAL FIELD

The present disclosure relates to image capture devices (e.g., cameras, video recorders, cell phones, etc.) and corresponding accessories for use therewith. More specifically, the present disclosure relates to couplers (mounts) that facilitate the releasable connection of an image capture device and an accessory.

BACKGROUND

The connection mechanisms currently used to secure together image capture devices and accessories often require significant dexterity and can be cumbersome to operate. The present disclosure provides various embodiments of couplers (mounts) that not only simplify the connection and disconnection of an image capture device and an accessory, but also improve the ease of use.

SUMMARY

In one aspect of the present disclosure, a coupler (mount) is disclosed that is configured to releasably connect an image capture device and an accessory. The coupler includes a shaft that is configured for insertion into the image capture device and the accessory, and a lever that is operatively connected to the shaft such that the coupler is repositionable between: an unlocked position, in which the image capture device and the accessory are movable in relation to each other; a locked position, in which the image capture device and the accessory are fixed in relation to each other; a disengaged position, in which the shaft is removable from the image capture device and the accessory; and an engaged position, in which the shaft is non-removable from the image capture device and the accessory. The coupler is repositionable between the unlocked position and the locked position via pivotal movement of the lever, and the coupler is repositionable between the disengaged position and the engaged position via concomitant rotation of the lever and the shaft through a range of motion of (approximately) 90 degrees.

In certain embodiments, the shaft may be configured for releasable engagement with an end cap. In certain embodiments, the shaft may be separable from the end cap when the coupler is in the disengaged position and securely connected to the end cap when the coupler is in the engaged position. In certain embodiments, the end cap may be secured to the accessory. In certain embodiments, the end cap may include a retention member. In certain embodiments, the shaft may include an operative end that is configured for releasable engagement with retention member. In certain embodiments, the retention member may extend transversely in relation to a longitudinal axis defined by the shaft. In certain embodiments, the end cap may define a cavity that is configured to receive the operative end of the shaft to facilitate releasable engagement between the shaft and the retention member. In certain embodiments, the operative end of the shaft may include first and second channel portions, as well as first and second receptacles that are in respective communication with the first and second channel portions. In certain embodiments, the first and second channel portions may be configured to receive the retention member during insertion of the shaft into the image capture device and the accessory. In certain embodiments, the first and second receptacles may be configured to receive the retention member during repositioning of the coupler from the disengaged position into the engaged position. In certain embodiments, the first and second channel portions may be generally identical (or generally identical). In certain embodiments, the first and second receptacles may be identical (or generally identical). In certain embodiments, the first and second channel portions may be offset by (approximately) 180 degrees. In certain embodiments, the first and second receptacles may be offset by (approximately) 180 degrees. In certain embodiments, the first receptacle may extend from the first channel portion in orthogonal (or generally orthogonal) relation, and the second receptacle may extend from the second channel portion in orthogonal (or generally orthogonal) relation. In certain embodiments, the first receptacle may extend from the first channel portion and the second receptacle may extend from the second channel portion in a common circumferential (angular, rotational) direction (e.g., clockwise or counterclockwise). In certain embodiments, the coupler may further comprise a pivot member that is connected to the shaft. In certain embodiments, the pivot member may extend into the lever such that the lever is pivotable in relation to the shaft during repositioning of the coupler between the unlocked position and the locked position. In certain embodiments, the pivot member and the shaft may be configured for threaded engagement such that the pivot member and the shaft are releasably connectable. In certain embodiments, the lever may include a cam member that is configured such that pivotal movement of the lever causes axial translation of the shaft during repositioning of the coupler between the unlocked position and the locked position. In certain embodiments, the coupler may further include a bearing member that is positioned between the lever and the accessory. In certain embodiments, the bearing member may be configured for engagement with the cam member to distribute forces applied by the cam member to the accessory during repositioning of the coupler between the unlocked position and the locked position. It is envisioned that the coupler described above may include any combination of features and elements described in this paragraph.

In another aspect of the present disclosure, a coupler (mount) is disclosed that is configured to releasably connect an image capture device and an accessory. The coupler includes a base and protrusions that extends upwardly from the base. The protrusions include a stationary protrusion that is fixedly connected to the base and movable protrusions that are located outwardly of the stationary protrusion. The movable protrusions are pivotably connected to the base such that the coupler is reconfigurable between an open configuration, in which the movable protrusions are separated by a first lateral distance, and a closed configuration, in which the movable protrusions are separated by a second lateral distance that is less than the first lateral distance.

In certain embodiments, the movable protrusions may each include a detent that is configured for insertion into a corresponding opening on the image capture device. In certain embodiments, the coupler may further include a closure member that extends through the protrusions. In certain embodiments, the closure member may be configured to apply an inwardly-directed force to the protrusions during movement of the closure member from an unlocked position into a locked position, which thereby reconfigures the coupler from the open configuration into the closed configuration. In certain embodiments, the coupler may further include a biasing member that is supported by the closure member. In certain embodiments, the biasing member may be configured to bias the coupler towards the open configuration. It is envisioned that the coupler described above may include any combination of features and elements described in this paragraph.

In another aspect of the present disclosure, a coupler (mount) is disclosed that is configured to releasably connect an image capture device and an accessory. The coupler includes: a clamp plate; a retainer; and a closure member. The clamp plate defines a channel that is configured to receive the image capture device along an axis of insertion. The retainer extends into the channel and is configured to engage the image capture device. The closure member extends through the clamp plate and is movable between an unlocked position, in which the image capture device is insertable into the coupler, and a locked position, in which the closure member applies an inwardly-directed force to the clamp plate to thereby compress the clamp plate about the image capture device and secure the image capture device within the coupler.

In certain embodiments, the clamp plate includes at least one alignment member that is configured for engagement with the image capture device to facilitate proper registration of the coupler and the image capture device and inhibit relative rotation between the coupler and the image capture device. In certain embodiments, the at least one alignment member includes a first alignment member that defines a generally annular transverse cross-sectional configuration and a second alignment member that defines a non-annular transverse cross-sectional configuration. In certain embodiments, the second alignment member may define a generally D-shaped transverse cross-sectional configuration. It is envisioned that the coupler described above may include any combination of features and elements described in this paragraph.

BRIEF DESCRIPTION OF THE DRAWINGS

The present disclosure is best understood from the following detailed description when read in conjunction with the accompanying drawings. It is emphasized that, according to common practice, the various features of the drawings may not be to-scale. On the contrary, the dimensions of the various features may be arbitrarily expanded or reduced for clarity.

DETAILED DESCRIPTION

Figure 1A:
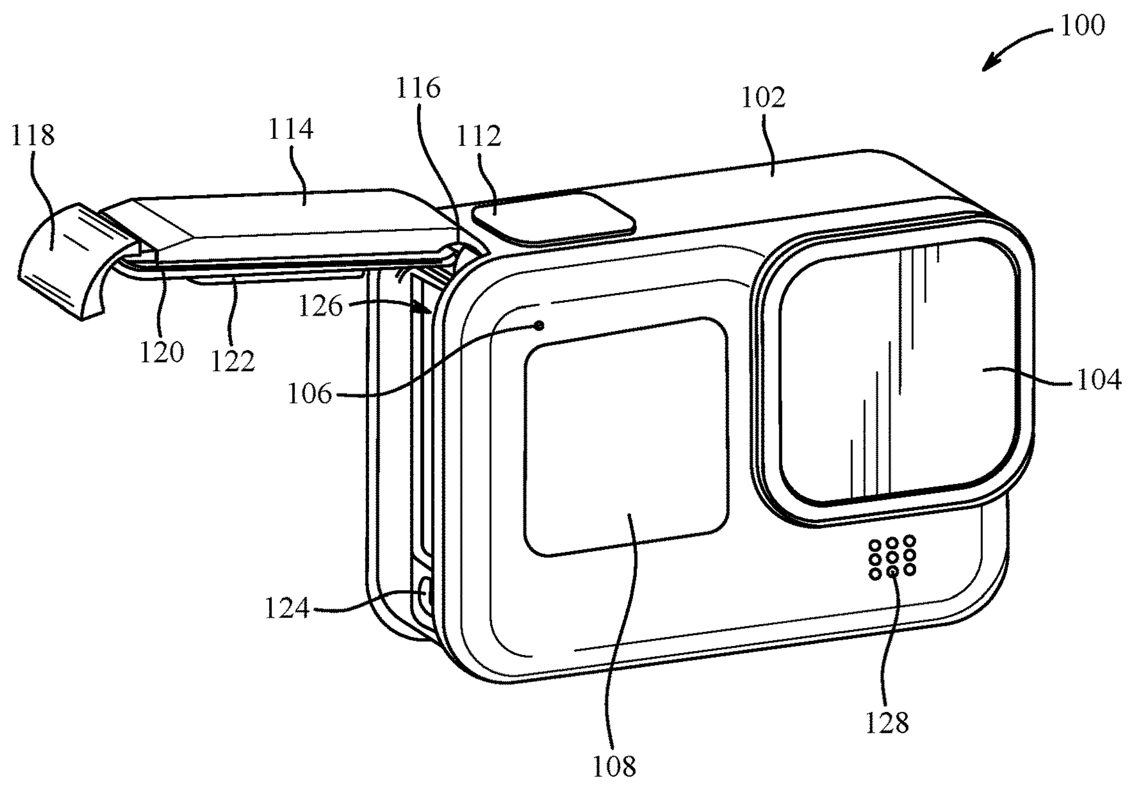
FIGS. 1A-B are isometric views of an example of an image capture device.

The present disclosure relates to couplers (mounts) that are configured to releasably connect an image capture device and an accessory. In one embodiment, the coupler includes a shaft that is configured for insertion into the image capture device and the accessory and a lever that is operatively connected to the shaft such that the coupler is repositionable between unlocked (open) and locked (closed) positions as well as between engaged and disengaged positions. When the coupler is in the unlocked position, the image capture device and the accessory are movable (e.g., tiltable) in relation to each other, and when the coupler is in the locked position, the image capture device and the accessory are fixed in relation to each other. When the coupler is in the disengaged position, the shaft is removable from the image capture device and the accessory, and when the coupler is in the engaged position, the shaft is non-removable from the image capture device and the accessory. Whereas the coupler is repositionable between the unlocked and locked positions via pivoting of the lever, the coupler is repositionable between the disengaged and engaged positions via concomitant rotation of the lever and the shaft.

The shaft includes an operative end (e.g., opposite to the lever) that is configured for releasable engagement with an end cap during repositioning of the coupler between the engaged and disengaged positions. In various embodiments of the disclosure, it is envisioned that the end cap may be incorporated into (e.g., fixed to) the accessory or provided as a separate component. The operative end of the shaft includes opposing slots that are L-shaped (or generally L-shaped) in configuration. More specifically, the slots define a pair of hooks that are configured for engagement and disengagement with a retention member in the end cap via rotation of the lever to thereby (releasably) secure the shaft to the end cap.

The coupler includes a pivot member that is connected to the shaft. The pivot member extends into the lever such that the lever is pivotable in relation to the shaft during repositioning of the coupler between the unlocked and locked positions (e.g., opening and closure). The lever includes a cam member which translates pivotal (rotational) movement of the lever into axial movement of the shaft to thereby apply a compressive force to the coupler and the image capture device that fixes the orientation (position) of the image capture device in relation to the coupler and, thus, the accessory.

In another embodiment of the disclosure, the coupler includes: a base; a series (plurality) of protrusions that extend upwardly from the base; and a closure member. More specifically, the coupler includes a stationary protrusion that is fixedly connected to the base and (first and second) movable protrusions that are pivotably connected to the base, which allows for reconfiguration of the coupler between open (unlocked) and closed (locked) configurations via movement of the closure member. During movement of the coupler from the open configuration into the closed configuration, the movable protrusions are brought into engagement with the image capture device, thereby securing together the image capture device, the coupler, and the accessory. More specifically, the movable protrusions include detents that are configured for insertion into corresponding openings in the image capture device.

In another embodiment, the coupler includes: a clamp plate defining a channel that is configured to receive the image capture device; a retainer, which extends into the channel and is configured to engage the image capture device; and a closure member, which extends through the clamp plate and is movable between an unlocked (open) position and a locked (closed) position. When the closure member is in the unlocked position, the image capture device is insertable into the channel, and when the closure member is in the locked position, the closure member applies an inwardly-directed force to the clamp plate to thereby compress the clamp plate about the image capture device and secure the image capture within the coupler.

Figure 1B:
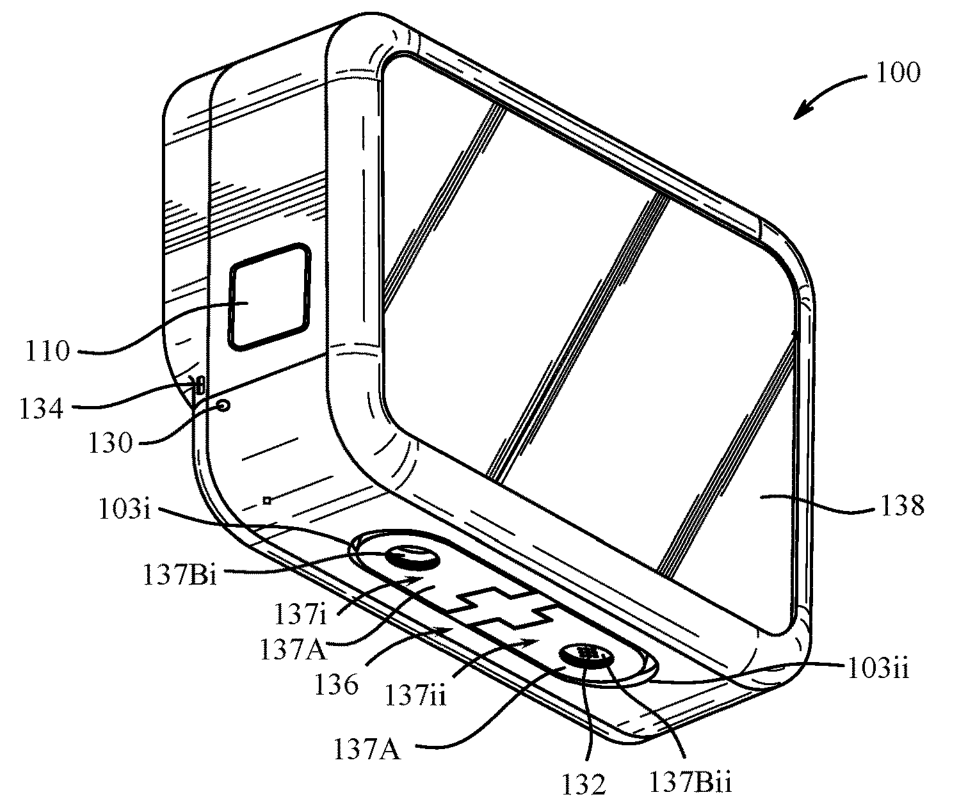

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include a (first) interconnect mechanism 136 for connecting the image capture device 100 to an accessory (FIGS. 4-8 below), handle grip, or other securing device. In the example shown in FIG. 1B, the interconnect mechanism 136 includes folding protrusions 137 (e.g., fingers 137A) that are configured to move between a nested or collapsed position as shown and an extended or open position (not shown) that facilitates coupling of the protrusions 137 to mating protrusions of other devices such as accessories, handle grips, mounts, clips, or like devices, as discussed in further detail below. More specifically, the interconnect mechanism 136 includes a (first) protrusion 137*i* defining a (first) opening 137Bi and a (second) protrusion 137*ii* defining a (second) opening 137Bii, which are moveable between the nested and extended positions independently of each other. As seen in FIG. 1B, for example, when the protrusions 137 are in the nested position, the protrusions 137 are received within (accommodated by) corresponding cavities 103, which extend (vertically upward) into the body 102 (e.g., towards the shutter button 112), and when the protrusions 137 are in the extended position, the protrusions 137 are removed from the cavities 103 such that the protrusions 137 extend (vertically downward) from the body (e.g., away from the shutter button 112). More specifically, the body 102 includes a (first) cavity 103*i* that is configured to receive the protrusion 137*i* when the protrusion 137*i* is in the nested position and a (second) cavity 103*ii* that is configured to receive the protrusion 137*ii* when the protrusion 137*ii* is in the nested position. To facilitate reception of the protrusions 137, the cavities 103 include identical (or generally identical) configurations, which correspond to those defined by the protrusions 137. As such, in the illustrated embodiment, the cavities 103 each include a D-shaped (or generally D-shaped) transverse (e.g., horizontal) cross-sectional configuration. It should be appreciated, however, that the particular configurations of the protrusions 137 and the cavities 103 may be altered in various embodiments without departing from the scope of the present disclosure.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e., a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
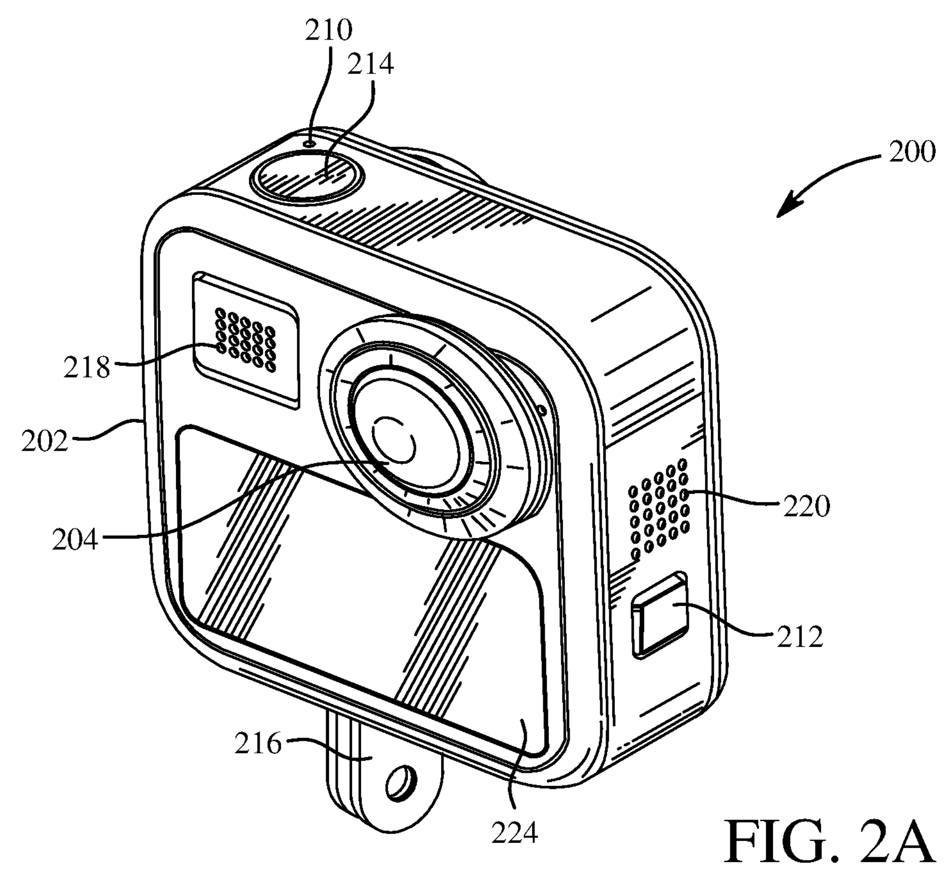
FIGS. 2A-B are isometric views of another example of an image capture device.
Figure 2B:
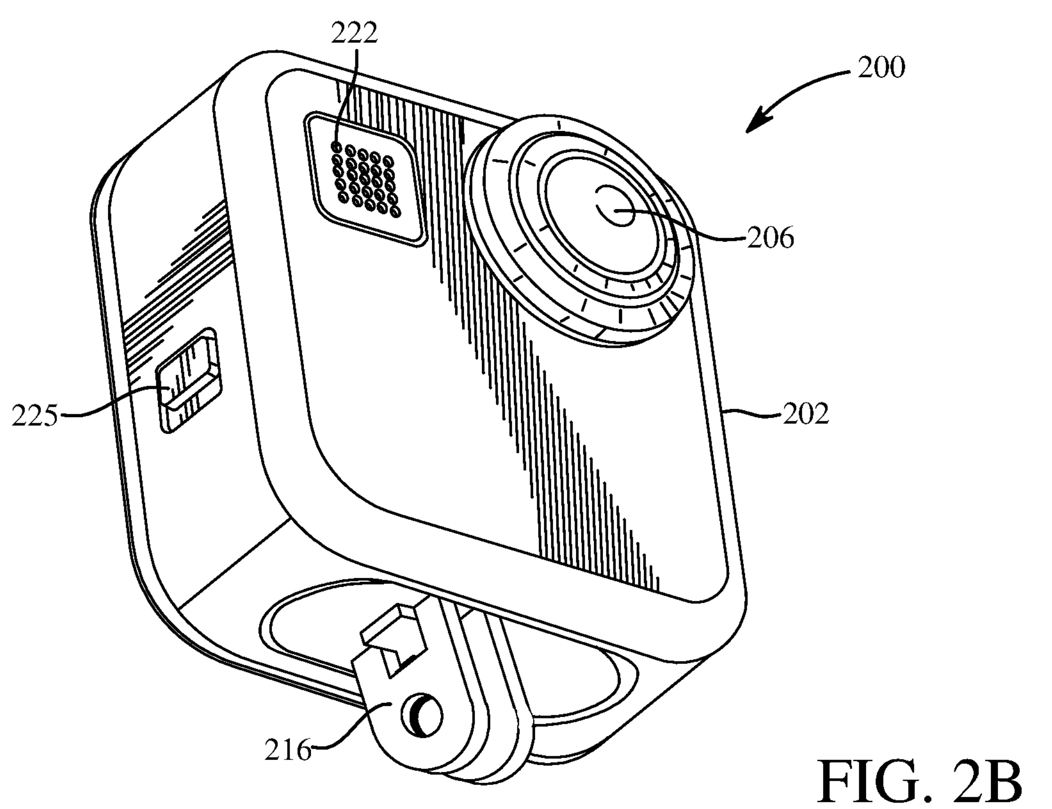

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 3:
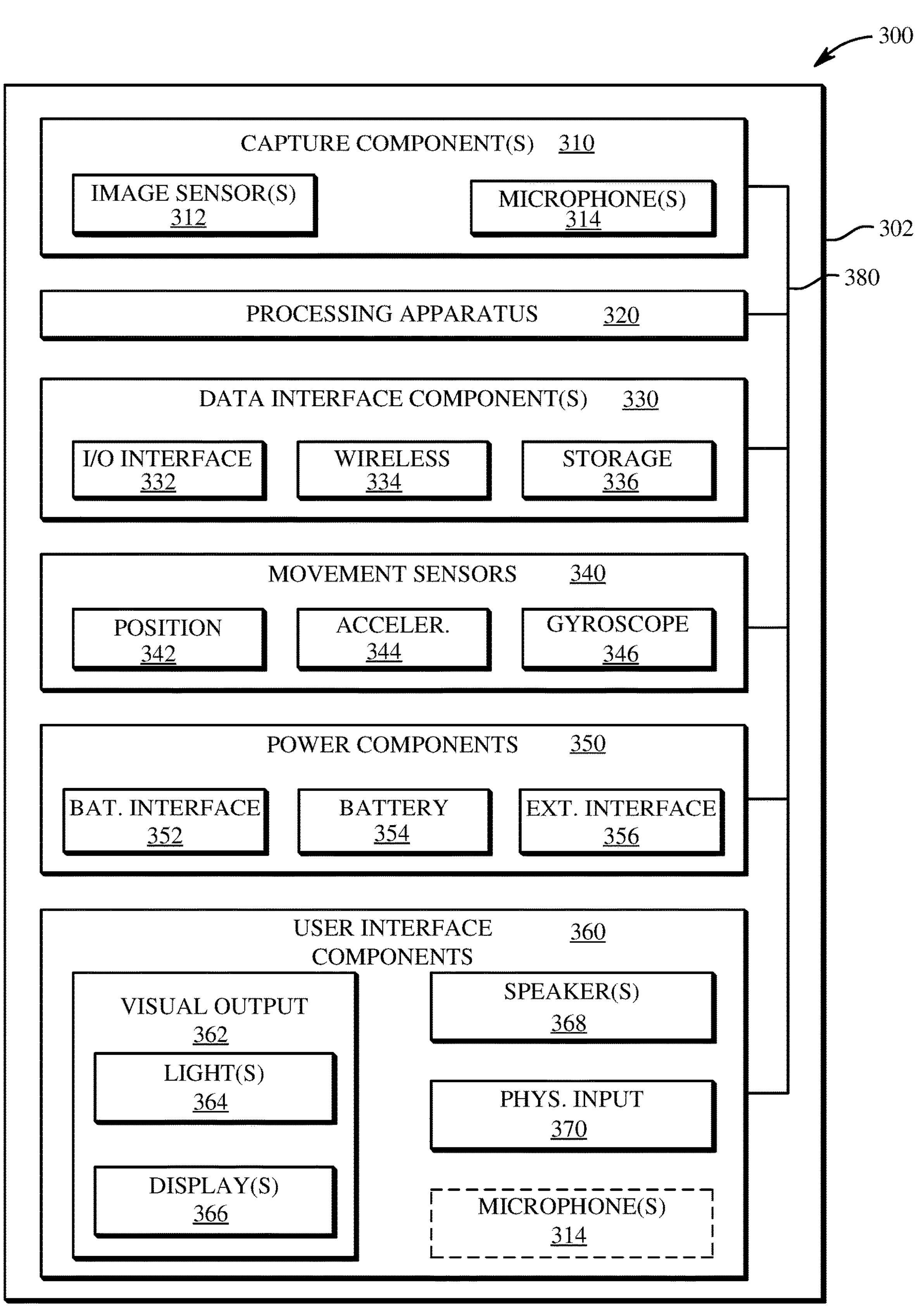
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B, 2A, and 2B.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

Figure 4:
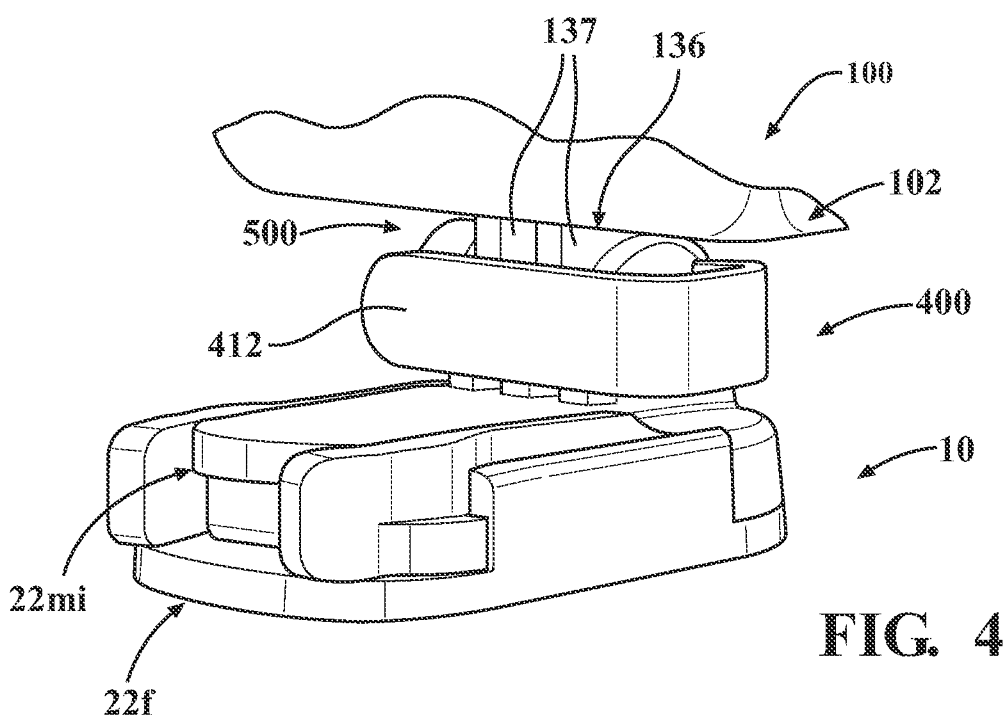
FIG. 4 is an end (e.g., front), perspective view of one embodiment of the presently disclosed coupler (mount) shown connected to an accessory and illustrated in locked (closed) and engaged positions.
Figure 5:
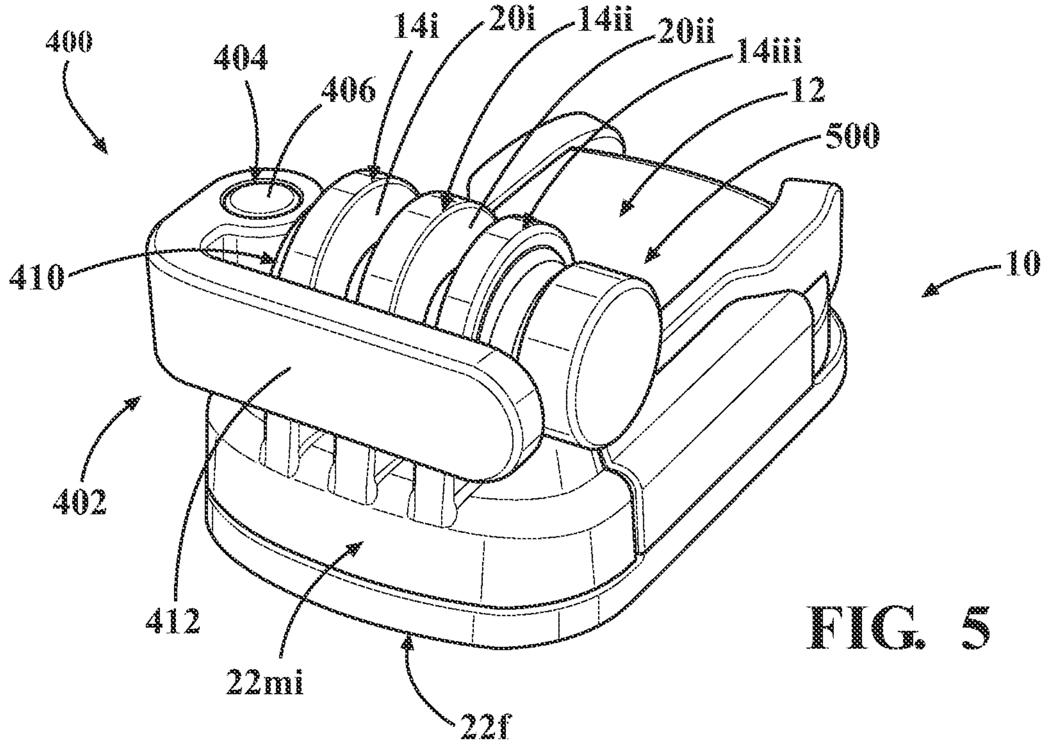
FIG. 5 is an end (e.g., rear), perspective view of the coupler and the accessory seen in FIG. 4 shown in an alternate orientation.
Figures 6, 7, 8:
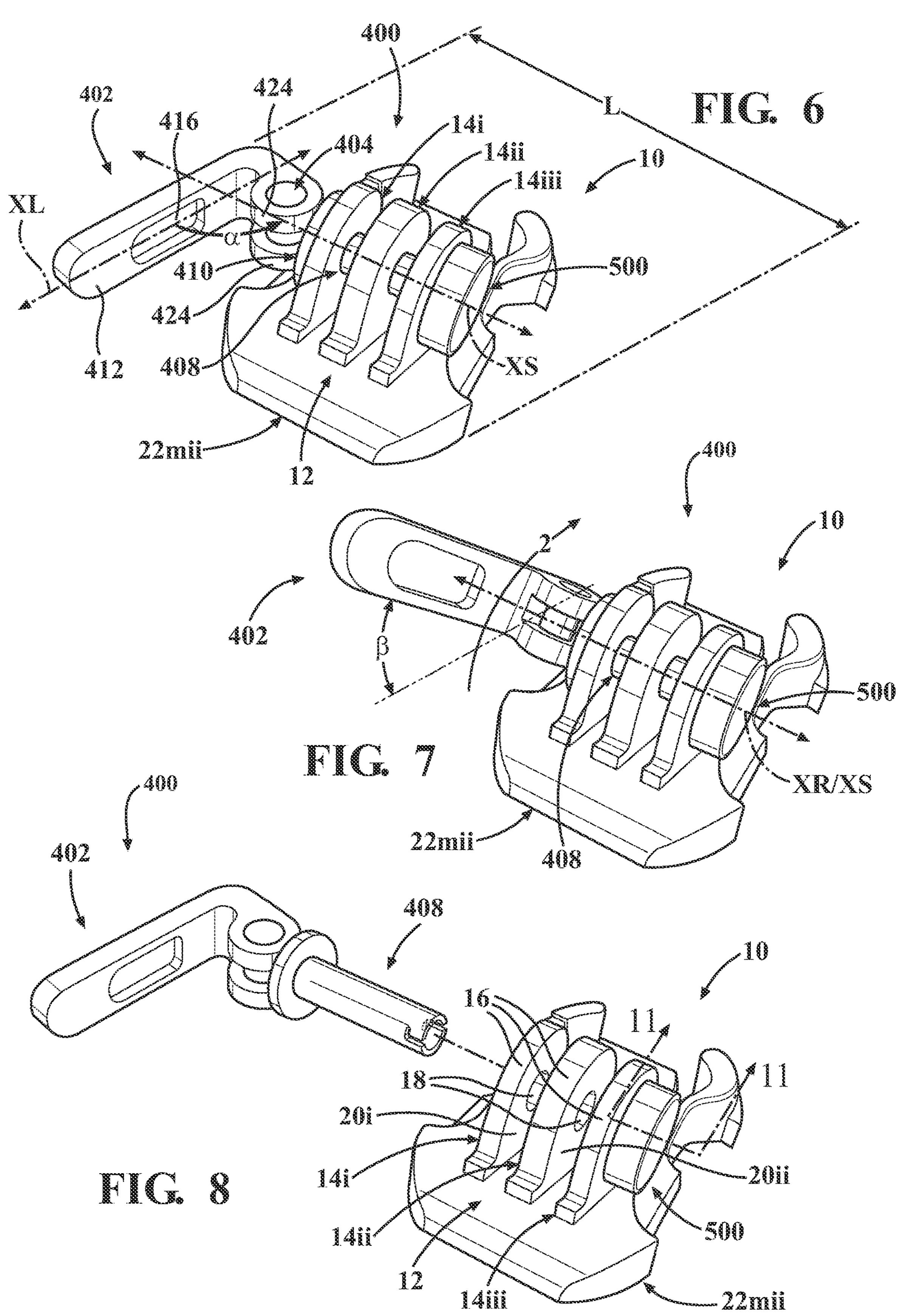
FIG. 6 is an end (e.g., rear), perspective view of the coupler and the accessory illustrating the coupler in an unlocked (open) position and the engaged position.
FIG. 7 is an end (e.g., rear), perspective view of the coupler and the accessory illustrating the coupler in the unlocked position and a disengaged position.
FIG. 8 is an end (e.g., rear), perspective view of the coupler shown removed from the accessory.
Figures 9, 10, 11:
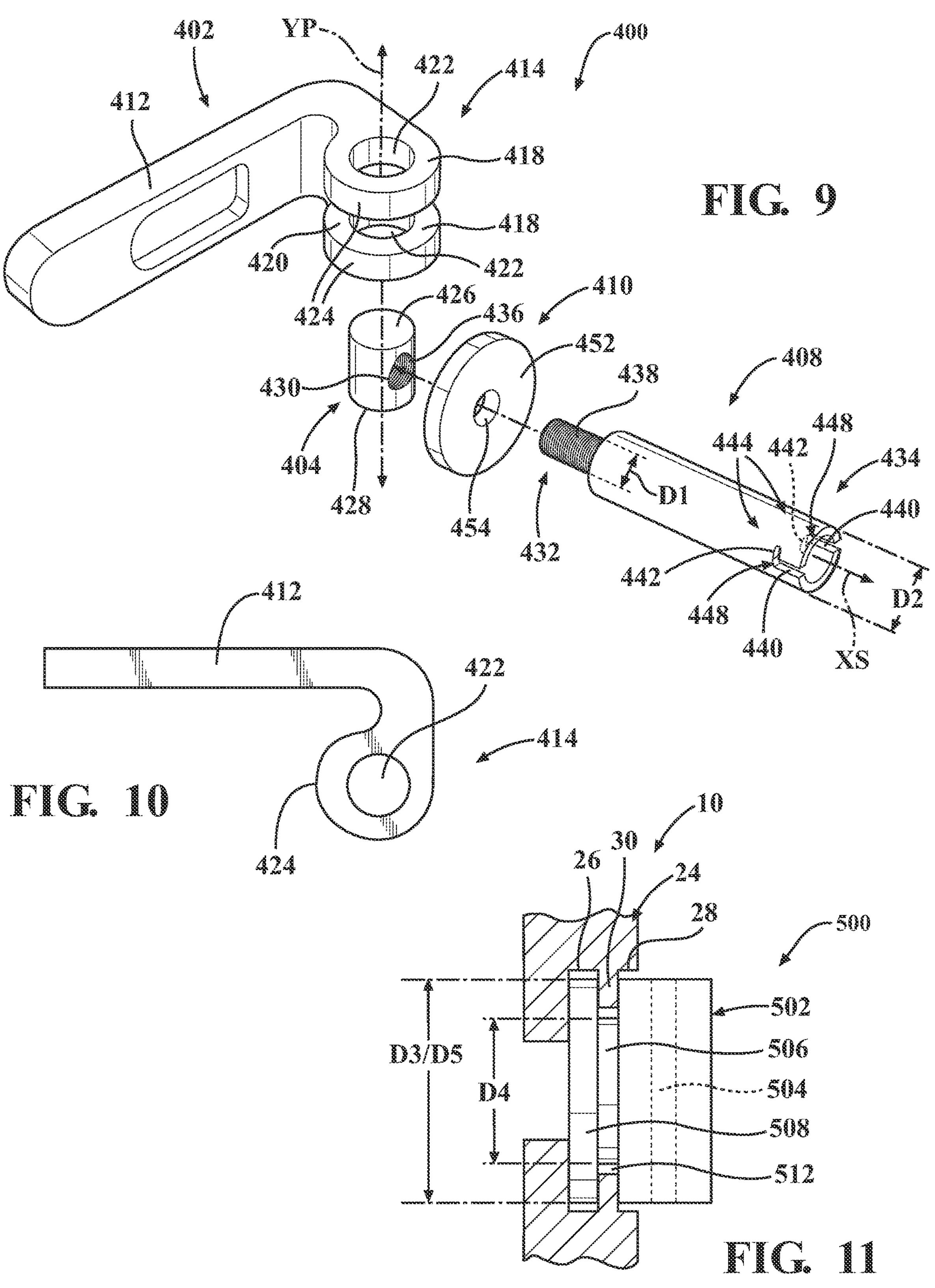
FIG. 9 is an exploded, perspective view of the coupler, which includes: a lever; a pivot member; a shaft; and a bearing member.
FIG. 10 provides a side, plan view of the lever.
FIG. 11 is a partial, longitudinal (vertical) cross-sectional view of the accessory taken through line 11-11 in FIG. 8.
Figures 12, 13, 14:
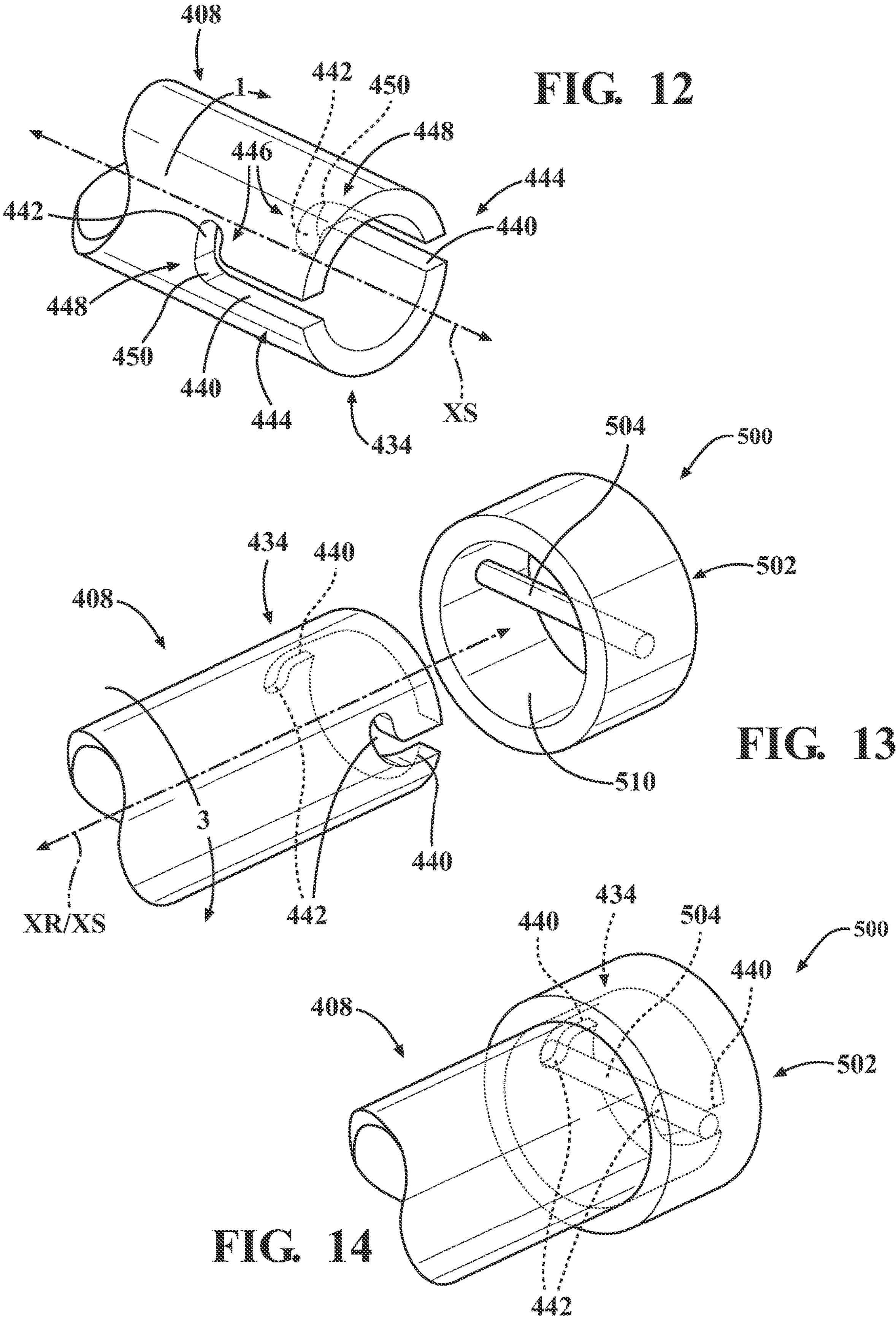
FIG. 12 is a partial, perspective view of the shaft.
FIG. 13 is a partial, perspective view of the shaft shown with an end cap of the accessory prior to connection of the shaft to the end cap.
FIG. 14 is a partial, perspective view of the shaft and the end cap upon connection.

Referring now to FIGS. 4-14, a coupler (mount) 400 will be discussed according to one embodiment of the present disclosure. More specifically, FIG. 4 provides an end (e.g., front), perspective view of the coupler 400 shown connected to an accessory 10 (in a first configuration/orientation) and illustrated in the locked and engaged positions; FIG. 5 provides an end (e.g., rear), perspective view of the coupler 400 and the accessory 10 (shown in an alternate orientation); FIG. 6 provides an end (e.g., rear), perspective view of the coupler 400 and the accessory 10 with the coupler 400 illustrated in the unlocked and engaged positions; FIG. 7 provides an end (e.g., rear), perspective view of the coupler 400 and the accessory 10 with the coupler 400 illustrated in the unlocked and disengaged positions; FIG. 8 provides an end (e.g., rear), perspective view of the coupler 400 shown removed from the accessory 10; FIG. 9 provides an exploded, perspective view of the coupler 400, which includes a lever 402; a pivot member 404 (e.g., a barrel nut 406); a shaft 408 defining a longitudinal axis XS; and a bearing member 410; FIG. 10 provides a side, plan view of the lever 402; FIG. 11 provides a partial, longitudinal (vertical) cross-sectional view of the accessory 10, which includes an end cap 500 that is configured for engagement with the coupler 400; FIG. 12 is a partial, perspective view of the shaft 408; FIG. 13 is a partial, perspective view of the shaft 408 shown with the end cap 500 prior to connection of the shaft 408 to the end cap 500; and FIG. 14 is a partial, perspective view of the shaft 408 and the end cap 500 upon connection.

Although generally discussed in connection with the image capture device 100 herein below, it should be appreciated that the coupler 400 may be configured for use with any image capture device, such as the various embodiments described herein above (e.g., the aforedescribed image capture devices 200, 300). It is also envisioned that the coupler 400 may be utilized in connection with a housing (e.g., a dive housing) for any of the image capture devices 100, 200, 300, etc., described herein, or any other ancillary component or system used to support, enclose, or otherwise accommodate any of the aforedescribed image capture devices 100, 200, 300, etc. As such, throughout the following disclosure, the term "image capture device" should be understood as referring to either the image capture device 100, 200, 300, etc., itself, to a housing for any of the image capture devices 100, 200, 300, etc., or to any other such ancillary component or system.

The coupler 400 is configured to releasably connect the image capture device 100 to the accessory 10 such that the image capture device 100 and the accessory 10 are repeatedly connectable and disconnectable. To facilitate connection of the accessory 10 to the image capture device 100, the accessory 10 includes a (second) interconnect mechanism 12 (FIGS. 5, 6, 8) that is configured for releasable engagement with (coupling to) the (first) interconnect mechanism 136 (FIGS. 1B, 4) on the image capture device 100. More specifically, the interconnect mechanism 12 includes (a set, series, plurality of) protrusions 14 (e.g., fingers 16) that interface (engage) with (connect to) the protrusions 137 (FIGS. 1B, 4) on the image capture device 100. The protrusions 14 each include an opening 18 (FIG. 8) and define channels 20 therebetween that are configured to receive the protrusions 137 such that the protrusions 137 are received by (positioned within) the channels 20, which facilitates proper alignment (registration) of the openings 18, 137B (FIG. 1B) respectively defined by the protrusions 14, 137 during connection of the image capture device 100 and the coupler 400. While the interconnect mechanism 12 is shown as including three protrusions 14*i*, 14*ii*, 14*iii* and two channels 20*i*, 20*ii* in the particular embodiment illustrated, it should be appreciated that the particular numbers of protrusions 14 and channels 20 may be varied in alternate embodiments without departing from the scope of the present disclosure (e.g., depending on the number of protrusions 137 included on the image capture device 100).

Figures 17, 18, 19, 20, 21:
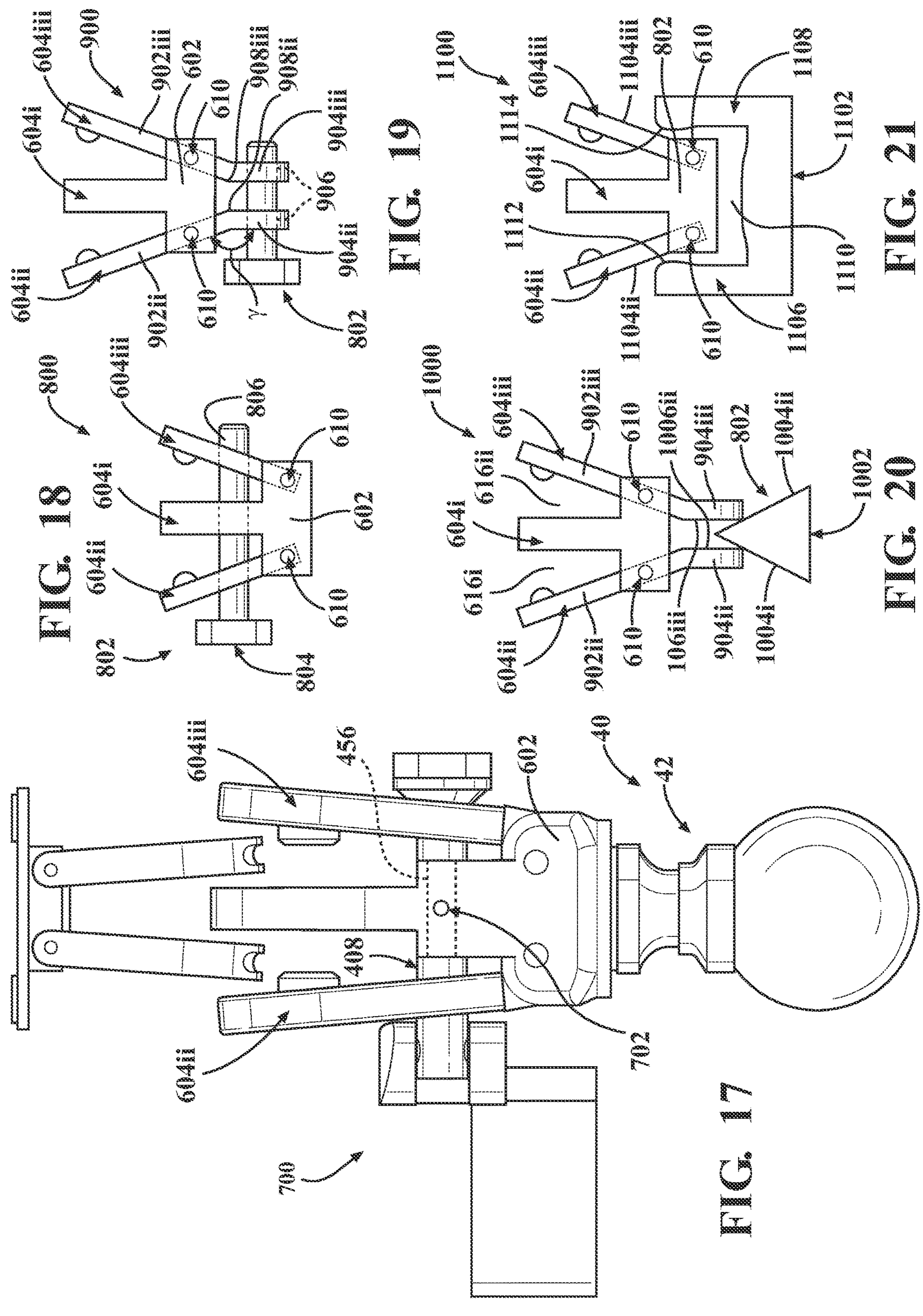
FIG. 17 is an end (e.g., rear), plan view of alternate embodiments of the coupler and the accessory seen in FIGS. 15 and 16.
FIG. 18 is an end (e.g., front), plan view of an alternate embodiment of the coupler shown in an open configuration.
FIG. 19 is an end (e.g., front), plan view of an alternate embodiment of the coupler shown in an open configuration.
FIG. 20 is an end (e.g., front), plan view of an alternate embodiment of the coupler shown in an open configuration.
FIG. 21 is an end (e.g., front), plan view of an alternate embodiment of the coupler shown in an open configuration.

Although depicted as a male buckle 22*mi* (FIGS. 4, 5) that is configured for releasable connection to (insertion into) a corresponding female buckle 22*f* in the particular embodiment illustrated, it should be appreciated that the configuration of the accessory 10 may be varied without departing from the present disclosure. For example, it is envisioned that the interconnect mechanism 12 may instead extend from the female buckle 22*f*, or that the male buckle 22*m* may be replaced by a ball joint (as seen in FIG. 17, for example) that is configured for reception within a corresponding socket (not shown). Additionally, it is envisioned that the buckles 22 may be provided in different styles or configurations, depending upon the intended use. For example, FIGS. 4 and 5 illustrate one style of the male buckle 22*mi*, in which the protrusions 14 extend from an end portion thereof, whereas FIGS. 6-8 illustrate an alternate style of the male buckle, which is identified by the reference character 22*mii*, in which the protrusions 14 are spaced inwardly from the end portions thereof and extend from a central portion of the male buckle 22*mii*.

The coupler 400 may include (e.g., may be formed from) any suitable material or combination of materials, which may include metallic (e.g., aluminum, steel, etc.) and/or non-metallic (e.g., polymeric, plastic, composite, etc.) and which may be identical or non-identical. As such, embodiments are envisioned in which the various components of the coupler 400 may include (e.g., may be formed from) the same material, as are embodiments in which the various components of the coupler 400 may include (e.g., may be formed from) a variety of materials. For example, it is envisioned that one component of the coupler 400 (e.g., the lever 402) may include a first material (e.g., a non-metallic material) and that another component of the coupler 400 (e.g., the pivot member 404) may include a second, different material (e.g., a metallic material).

In the particular embodiment illustrated, the lever 402, the pivot member 404, the shaft 408, and the bearing member 410 are configured as discrete components of the coupler 400. It is also envisioned, however, that one or more components of the coupler 400 may be integrally (e.g., monolithically, unitarily) formed, as described in further detail below.

As mentioned above, the coupler 400 is repositionable between locked (closed) and unlocked (open) positions as well as engaged and disengaged positions. When the coupler 400 is in the locked (closed) position (FIGS. 4, 5), the image capture device 100 and the accessory 10 are fixed (e.g., non-pivotable, non-tiltable) in relation to each other, and when the coupler 400 is in the unlocked (open) position (FIGS. 6, 7), the image capture device 100 and the accessory 10 are movable (e.g., pivotable, tiltable) in relation to each other, which allows for variation in the orientation of the image capture device 100 (e.g., by adjusting the tilt angle). When the coupler 400 is in the engaged position (FIGS. 4-6, 14), the coupler 400 engages (is connected to) the end cap 500, thereby securing together (connecting) the image capture device 100 and the accessory 10, and when the coupler 400 is in the disengaged position (FIG. 7), the coupler 400 is disengaged from the end cap 500, which allows for connection and disconnection of the image capture device 100 and the accessory 10.

The lever 402 includes a handle (grip, tactile member) 412 and a yoke 414 (FIG. 9) and facilitates repositioning of the coupler 400 between the disengaged and engaged positions as well as repositioning of the coupler 400 between the locked position (FIGS. 4, 5) and the unlocked position (FIG. 6). When the coupler 400 is in the locked position, the lever 402 is in a first position, in which the lever 402 is located adjacent (or generally adjacent) to the interconnect mechanism 12 and is oriented in parallel (or generally parallel) relation to the shaft 408. By contrast, when the coupler 400 is in the unlocked position, the lever 402 is in a second position, in which the lever 402 is separated (spaced) from the interconnect mechanism 12 and is oriented so as to subtend an angle $\alpha$ (FIG. 6) with the shaft 408 that lies substantially within the range of (approximately) 75 degrees to (approximately) 105 degrees. The angle $\alpha$ realized in the unlocked position allows for sufficient lateral separation (spacing) between the lever 402 and the body 102 (FIG. 4) of the image capture device 100 to allow for concomitant rotation of the lever 402 and the shaft 408 during repositioning of the coupler 400 between the disengaged position (FIG. 7) and the engaged position (FIG. 6). More specifically, in the particular embodiment illustrated, the coupler 400 is configured such that the lever 402 is oriented in orthogonal (or generally orthogonal) relation to the shaft 408 when the coupler 400 unlocked position (e.g., such that the angle $\alpha$ is equal (or approximately equal) to 90 degrees). It should be appreciated, however, that embodiments in which the angle $\alpha$ may lie outside the disclosed range are also envisioned herein and would not be beyond the scope of the present disclosure.

When the coupler 400 is in the engaged position (FIGS. 4-6, 14), the lever 402 is in a first angular orientation and the shaft 408 securely engages (is connected to) the end cap 500, whereby the shaft 408 is non-removable from the end cap 500 (as well as the image capture device 100 and the accessory 10). By contrast, when coupler 400 is in the disengaged position (FIG. 7), the lever 402 is in a second angular orientation and the shaft 408 is disengaged (disconnected) from the end cap 500, which allow for removal of the shaft 408 from the end cap 500 (as well as the image capture device 100 and the accessory 10). The second angular orientation is offset from the first orientation by a circumferential (angular, rotational) distance $\beta$ (FIG. 7) that lies substantially within the range of (approximately) 30 degrees to (approximately) 135 degrees, which defines a circumferential (angular, rotational) range of motion for the lever 402 and the shaft 408 during movement of the coupler 400 between the engaged position and the disengaged position. More specifically, in the particular embodiment illustrated, the coupler 400 is configured such that the circumferential distance (e.g., the angular range of motion) is equal (or approximately equal) to 90 degrees (e.g., a quarter-turn of the lever 402). It should be appreciated, however, that embodiments in which the circumferential distance $\beta$ (and, thus, the range of angular range of motion) may lie outside the disclosed range are also envisioned herein, and would not be beyond the scope of the present disclosure.

The handle 412 facilitates manual manipulation and repositioning of the lever 402 and extends along a longitudinal axis XL (FIG. 6). To reduce the overall weight of the coupler 400, the handle 412 includes one or more reliefs 416. It should be appreciated, however, that the relief(s) 416 may be eliminated in alternate embodiments without departing from the scope of the present disclosure.

The yoke 414 (FIG. 9) extends transversely from the handle 412 (e.g., in orthogonal (or generally orthogonal) relation thereto) and includes a forked configuration that defines a pair of eye members 418 and a receiving space 420. Each eye member 418 includes an opening 422 and one or more cam members 424. The openings 422 are configured to receive the pivot member 404 such that the pivot member 404 extends (is insertable into) the lever 402 so as to define a pivot axis YP for the lever 402. The cam members(s) 424 extend outwardly (laterally, radially) from the eye members 418 and are configured for engagement (contact) with the bearing member 410 such that (pivotal) movement of the lever 402 (during repositioning of the coupler 400 between the unlocked and locked positions) causes corresponding axial translation (movement) of the shaft 408, as described in further detail below. While the lever 402 is shown as including a pair of cam members 424 in the particular embodiment illustrated (e.g., one cam member 424 extending from each of the eye members 418), it should be appreciated that the number of cam members 424 may be varied in alternate embodiments without departing from the scope of the present disclosure. For example, an embodiment including a single cam member 424 is also envisioned herein.

In the particular embodiment illustrated, the cam member(s) 424 are configured such that they are separated (spaced apart from) the bearing member 410 (along the longitudinal axis XS of the shaft 408) when the coupler 400 is in the unlocked position. Embodiments are also envisioned, however, in which the cam member(s) 424 may be configured such that they are in constant engagement (contact) with the bearing member 410, regardless of the position of the coupler 400.

In the particular embodiment illustrated, the eye members 418 and the pivot member 404 define corresponding annular (or generally annular) transverse (horizontal) cross-sectional configurations (e.g., such that the pivot member 404 includes a cylindrical (or generally cylindrical) configuration). It should be appreciated, however, that the particular transverse cross-sectional configurations of the eye members 418 and the pivot member 404 may be altered in various embodiments without departing from the scope of the present disclosure. For example, embodiments in which the transverse cross-sectional configurations defined by the eye members 418 and the pivot member 404 may be non-annular (e.g., polygonal) are also envisioned herein.

The pivot member 404 includes opposing ends 426, 428, each of which is planar (or generally planar) in configuration, and an aperture 430 that is configured to receive the shaft 408 so as to facilitate connection of the shaft 408 to the pivot member 404, as described in further detail below. The pivot member 404 is configured for insertion into the yoke 414 via the openings 422 in the eye members 418 such that the pivot member 404 extends into the lever 402 and is located within the receiving space 420 in a manner that allows for (rotational, pivotal) movement of the lever 402 in relation to the pivot member 404 and the shaft 408 during repositioning of the coupler 400 between the unlocked and locked positions, as described in further detail below. Although shown as being removable (separable) from the handle 412 in the particular embodiment illustrated, embodiments are also envisioned in which the pivot member 404 may be captive to (e.g., non-removable from) the handle 412.

The shaft 408 is connected (connectable) to the pivot member 404 and is configured for insertion into (and through) the image capture device 100 and the accessory 10. As seen in FIG. 9, the shaft 408 includes a first end 432 defining a (first) transverse cross-sectional dimension D1 and an opposing second (operative) end 434 defining a (second) transverse cross-sectional dimension D2, which is greater than the transverse cross-sectional dimension D1. The reduced transverse cross-sectional dimension D1 defined by the first end 432 facilitates engagement (connection) between the shaft 408 and the pivot member 404 via insertion of the first end 434 into the aperture 430, which operatively (e.g., indirectly) connects the lever 402 to the shaft 408 via the pivot member 404. More specifically, the first end 432 is configured for positioning between the eye members 418 of the yoke 414 such that the first end 432 is located within the receiving space 420 upon connection of the shaft 408 to the pivot member 404.

In the particular embodiment illustrated, the aperture 430 and the first end 432 of the shaft 408 include corresponding threading 436, 438, respectively, which facilitates releasable engagement (connection) of the shaft 408 and the pivot member 404. It is envisioned, however, that the manner of engagement between the shaft 408 and the pivot member 404 may be varied in alternate embodiments without departing for the scope of the present disclosure. For example, it is envisioned that the threading 436, 438 may be omitted and that the shaft 408 may be configured for engagement with the pivot member 404 in an interference fit, via a set screw that extends through the pivot member 404 and into the shaft 408, or in any other suitable manner. It is also envisioned that the pivot member 404, the shaft 408, and the bearing member 410 may be fixedly connected. For example, in one particular embodiment, it is envisioned that the pivot member 404, the shaft 408, and the bearing member 410 may be integrally (e.g., monolithically, unitarily) formed.

The second end 434 of the shaft 408 is configured for releasable engagement with the end cap 500 during repositioning of the coupler 400 between the disengaged position (FIG. 7) and the engaged position (FIGS. 4-6, 14). More specifically, the second end 434 of the shaft 408 includes a pair of (e.g., first and second) channel portions 440 (FIGS. 9, 12, 13) and a pair of (e.g., first and second) receptacles 442 that extend from (are in communication with) the channel portions 440 so as to define pair of slots 444. The channel portions 440 are identical (or generally identical) in configuration and are positioned in diametrical (or approximately diametrical) opposition to each other (e.g., such that the channel portions 440 are offset by (approximately) 180 degrees). The receptacles 442 are likewise identical (or generally identical) in configuration and are positioned in diametrical (or approximately diametrical) opposition to each other (e.g., such that the receptacles 442 are also offset by (approximately) 180 degrees). Whereas the channel portions 440 extend in parallel (or generally parallel) relation to the longitudinal axis XS of the shaft 408, the receptacles 442 and are oriented transversely in relation to both the channel portions 440 and the longitudinal axis XS. More specifically, the receptacles 442 extend from the channel portions 440 in orthogonal relation (or generally orthogonal relation) thereto in a common circumferential direction (a common angular direction, a common rotational direction) (e.g., clockwise or counterclockwise), which is identified by the arrow 1 in FIG. 12. The transverse relative orientation of the channel portions 440 and the receptacles 442 imparts an L-shaped (or generally L-shaped) configuration to the slots 444 that defines a pair of hooks (hook members) 446, which are configured for releasable engagement (contact) with the end cap 500 to releasably secure together the coupler 400 and the end cap 500, as described in further detail below.

The channel portions 440 and the receptacles 442 are connected via transition sections 448, which, in the particular embodiment illustrated, include radiused configurations that define arcuate (curved) guide surfaces 450. As described in further detail below, the arcuate configuration of the guide surfaces 450 facilitates movement (rotation) of the lever 402 from the second orientation into the first orientation and, thus, repositioning of the coupler 400 between the disengaged position (FIG. 7) and the engaged position (FIGS. 4-6, 14). Embodiments in which the transition sections 448 may be eliminated are also envisioned herein (e.g., such that the receptacles 442 are directly connected to the channel portions 440), however, and would not be beyond the scope of the present disclosure.

With reference now to FIGS. 11, 13, and 14 in particular, the end cap 500 will be discussed. In the particular embodiment illustrated, the end cap 500 is fixedly secured to a body 24 of the accessory 10 (e.g., the male buckles 22*mi*, 22*miii* (FIGS. 4-8)) in a manner that inhibits (if not entirely prevents) relative rotation therebetween. More specifically, the end cap 500 and the body 24 of the accessory 10 are integrally (e.g., monolithically, unitarily) formed together, such as, for example, via insert molding. Embodiments are also envisioned, however, in which the end cap 500 and the body 24 of the accessory 10 may be formed as separate components that are fixedly secured together via mechanical engagement (e.g., a set screw, a clip, or other such fastener), via an adhesive, etc., as are embodiments in which the end cap 500 may be provided as discrete (separate) component of either the accessory 10 or the coupler 400.

The end cap 500 includes: a housing 502; a retention member 504 (e.g., a rod, post, cable, etc.); a neck 506; and a flange 508 (also referred to as a first flange) (e.g., a rib, a shoulder, or other such projection). Although shown as being integrally (e.g., monolithically, unitarily) formed in the particular embodiment illustrated, it is also envisioned that the various components of the end cap 500 may be formed separately and connected together in any suitable manner. For example, embodiments are envisioned in which the neck 506 and the flange 508 may be configured for releasable connection (e.g., via the engagement of corresponding threading).

The housing 502 defines a (first) outer transverse cross-sectional dimension D3 and an internal cavity 510 (FIG. 13). The internal cavity 510 accommodates the retention member 504 and is configured to receive the second end 434 of the shaft 408 during insertion of the coupler 400 and connection of the image capture device 100 and the accessory 10. More specifically, the retention member 504, which may be either flexible or rigid in construction, is located within the internal cavity 510 and is oriented in transverse (e.g., orthogonal (or generally orthogonal)) relation to the longitudinal axis XS defined by the shaft 408. The retention member 504 is configured for insertion into the channel portions 440 and the receptacles 442, which facilitates releasable engagement of (connection between) the shaft 408 and the end cap 500 during insertion of the shaft 408 into the end cap 500 and repositioning of the coupler 400 between the disengaged position (FIG. 7) and the engaged position (FIGS. 4-6, 14). More specifically, as described in further detail below, when the coupler 400 is in the disengaged position, the shaft 408 is positioned for engagement with, and separation from, the retention member 504, and when the coupler 400 is in the engaged position, the shaft 408 positively engages (contacts)

the retention member 504 such that the shaft 408 is securely engaged with (connected to) the end cap 500.

The neck 506 extends axially (longitudinally) from the housing 502 (e.g., in parallel (or generally parallel) relation to the longitudinal axis XS (FIG. 9) of the shaft 408). As seen in FIG. 11, the neck 506 defines a (second) outer transverse cross-sectional dimension D4, which is less than the transverse cross-sectional dimension D3 defined by the housing 502.

The flange 508 extends radially outward from the neck 506 and defines a (third) outer transverse cross-sectional dimension D5, which is greater than the outer transverse cross-sectional dimension D4 defined by the neck 506 and equal (or approximately equal) to the outer transverse cross-sectional dimension D3 defined by the housing 502. As a result of the reduced transverse cross-sectional dimension D4 (relative to the transverse cross-sectional dimensions D3, D5), the end cap 500 defines a (first) channel 512, which extends circumferentially about the neck 506 and is configured to receive the accessory 10, as described below.

With reference to FIG. 11 in particular, the body 24 of the accessory 10 defines (second and third) channels 26, 28, which are configured to receive the flange 508 and the housing 502 of the end cap 500, respectively. The channel 28 is positioned laterally outward of the channel 26 so as to define a (second) flange 30, which extends radially inward (e.g., towards the neck 506 of the end cap 500) and is configured for insertion into (reception by) the channel 512 such that the flange 30 is located between the housing 502 and the flange 508.

Receipt of the flanges 30, 508 within the respective channels 512, 26 renders the end cap 500 captive to the accessory 10 (e.g., such that the end cap 500 is non-removably connected to the accessory 10). To inhibit (if not entirely prevent) relative rotation between the end cap 500 and the accessory 10 (e.g., during connection and disconnection of the coupler 400 to the accessory 10), it is envisioned that the flanges 30, 508 and the channels 512, 26 may be configured so as to establish an interference (friction) fit between the end cap 500 and the body 24 of the accessory 10. Additionally, or alternatively, it is envisioned that relative rotation between the end cap 500 and the accessory 10 may be mechanically inhibited through use of corresponding detents and recesses, mechanical fasteners, etc., and/or through the use of an adhesive.

With reference now to FIGS. 6 and 9, the bearing member 410 will be discussed. The bearing member 410 is positioned between the lever 402 and the accessory 10 (e.g., the protrusion 14*i* of the interconnect mechanism 12) and is configured for engagement with the cam member(s) 424 during movement of the coupler 400 between the unlocked and locked positions. The bearing member 410 inhibits (if not entirely prevents) galling (or other such deformation) of the accessory 10 (e.g., the protrusion 14*i*) that may otherwise occur over time as a result of normal use and increases the surface area over which force is distributed during opening and closure of the coupler 400, which allows for improved consistency in the application of force across the protrusions 14 (FIGS. 6, 8), 137 (FIG. 4) respectively included on the accessory 10 and the image capture device 100. Absent the bearing member 410, the application of force to the accessory 10 would be localized to the surface area defined by the interface between the cam member(s) 424 and the accessory 10 (e.g., the protrusion 14*i*).

In the particular embodiment illustrated, the bearing member 410 is configured as a washer 452 (FIG. 9) that includes an annular (or generally annular) cross-sectional configuration and an aperture 454. The aperture 454 is configured to receive the first end 432 of the shaft 408 such that the shaft 408 extends through the bearing member 410 (and into the aperture 430 defined by the pivot member 404), which allows for relative axial and rotational movement between the bearing member 410 and the shaft 408 as well as relative rotational movement between the lever 402 (e.g., the cam member(s) 424) and the bearing member 410 during movement of the coupler 400 between the unlocked and locked positions, as described in further detail below. Embodiments are also envisioned, however, in which the bearing member 410 may be axially fixed in relation to the shaft 408. For example, it is envisioned that the bearing member 410 may be captive to the shaft 408. Illustratively, it is envisioned that the bearing member 410 may be retained on the shaft 408 by a collar, via location within a channel or the like, via the use of a mechanical fastener (e.g., a set screw, etc.), or in any other manner suitable for the intended purpose of inhibiting (if not entirely preventing) relative axial movement between the bearing member 410 and the shaft 408 while allowing for relative rotational movement between the bearing member 410 and the shaft 408 during movement of the coupler 400 between the unlocked and locked positions.

While the bearing member 410 and the shaft 408 are illustrated as being discrete components of the coupler 400 in the particular embodiment illustrated, which allows for separation of the bearing member 410 from the shaft 408 (e.g., upon removal of the shaft 408 from the pivot member 404), embodiments are also envisioned in which the bearing member 410 may be non-removable from the shaft 408. For example, it is envisioned that the shaft 408 and the bearing member 410 may be integrally (e.g., monolithically, unitarily) formed.

With reference now to FIGS. 4-14, use and operation of the coupler 400 will be discussed during connection of the image capture device 100 to the accessory 10. Initially, the coupler 400 is moved from the locked position (FIGS. 4, 5) into the unlocked position (FIG. 6) by pivoting (unfolding) the lever 402 outwardly (e.g., away from the interconnect mechanism 12) such that the lever 402 is moved from the first position into the second position. The coupler 400 is then moved from the engaged position (FIG. 6) into the disengaged position (FIG. 7) via concomitant movement (rotation) of the lever 402 and the shaft 408 in the direction identified by the arrow 2 (FIG. 7) about an axis of rotation XR, which is defined by the shaft 408 and is coincident with the longitudinal axis XS, such that the lever 402 is moved from the first orientation into the second orientation. Rotation of the lever 402 causes movement of the retention member 504 (FIGS. 11, 13, 14) through the receptacles 442 such that the retention member 504 is disengaged (separated) from, and moved out of alignment (registration) with, the hooks 446. Upon movement of the coupler 400 into the disengaged position, the retention member 504 is aligned (registered) with the channel portions 440, which allows for separation (disengagement, withdrawal) of the shaft 408 from the end cap 500 and removal of the coupler 400 from the accessory 10.

Following removal of the coupler 400 from the accessory 10, the protrusions 137 (FIG. 4) on the image capture device 100 are inserted into the channels 20 (FIGS. 5, 8) defined by the protrusions 14 on the accessory 10. The coupler 400 is then connected to the image capture device 100 and the accessory 10 via insertion of the shaft 408 through the openings 18 (FIG. 8), 137B (FIG. 1B) in the protrusions 14, 137, respectively, whereby the second end 434 of the shaft

408 is inserted into the cavity 510 (FIGS. 13, 14) defined by the end cap 500. During insertion of the shaft 408 into the end cap 500, the retention member 504 enters (is received by) the channel portions 440 and engages (contacts) the guide surfaces 450 (FIG. 12) defined by the transition sections 448, which promotes rotation of the lever 402 about the axis of rotation XR in the direction indicated by arrow 3 (FIG. 13), thereby urging the coupler 400 towards the engaged position. Continued (manual) rotation of the lever 402 in the direction indicated by arrow 3 causes reception of the retention member 504 by (e.g., insertion of the retention member 504 into) the receptacles 442, whereby the retention member 504 is moved into alignment (registration) and engagement (contact) with the hooks 446 as the coupler 400 is moved into the engaged position so as to secure (connect) the shaft 408 to the end cap 500 and secure (connect) the image capture device 100 to the accessory 10.

Following connection of the image capture device 100 to the accessory 10, and orientation of the image capture device 100 as desired (e.g., by varying the tilt angle of the image capture device 100), the coupler 400 is moved from the unlocked position (FIG. 6) into the locked position (FIGS. 4, 5). More specifically, force is (manually) applied to the lever 402 such that the lever 402 pivots about the pivot axis YP (FIG. 9) and folds inwardly (e.g., towards the interconnect mechanism 12) during movement from the second position into the first position. Due to the identical configuration of the channel portions 440 (FIG. 12) and the receptacles 442 at the second end 434 of the shaft 408, the coupler 400 is insertable into the image capture device 100 and the accessory 10 in multiple orientations, which simplifies use and operation of coupler 400. For example, the coupler 400 is insertable such that the lever 402 is positionable either forwardly (in front of) the image capture device 100, as seen in FIG. 4, or rearwardly (behind) the image capture device 100, as seen in FIG. 5.

During movement of the coupler 400 from the unlocked position into the locked position, as the lever 402 (e.g., the yoke 414) moves (pivots, rotates) in relation to the pivot member 404, the cam member(s) 424 (FIGS. 6, 9) engage (contact) and traverse the bearing member 410, which results in axial displacement (translation, sliding, pulling) of the shaft 408 away from the end cap 500 as well as rotation of the bearing member 410 in relation to both the lever 402 and the first end 432 of the shaft 408. During axial displacement of the shaft 408, the first end 432 moves (axially) through the aperture 454 in the bearing member 410, which allows for relative axial displacement between the bearing member 410 and the shaft 408. By virtue of the engagement (contact) between the second end 434 of the shaft 408 and the end cap 500 (e.g., via engagement (contact) between the hooks 446 (FIG. 12) and the retention member 504), axial displacement of the shaft 408 causes approximation of the lever 402 and the end cap 500, effectively reducing an overall axial dimension (length) L (FIG. 6) of the coupler 400 and applying an inwardly compressive force to the interconnect mechanisms 12 (FIGS. 5, 6, 8), 136 (FIGS. 1B, 4) respectively included on the accessory 10 and the image capture device 100. Compression of the interconnect mechanisms 12, 136 forces the protrusions 14, 137 into frictional engagement (contact), thereby fixing the orientation (and the tilt angle) of the image capture device 100 in relation to the accessory 10.

In the particular embodiment illustrated, the coupler 400 is configured so as to apply a break-torque threshold that lies substantially within the range of (approximately) 10 in./lb. to (approximately) 15 in./lb., whereby the relative orientations of the image capture device 100 and the accessory 10 are maintained absent the application of a break-torque exceeding that threshold. Upon exceeding the break-torque threshold, however, the frictional engagement between the protrusions 14, 137 may be overcome such that the relative orientations of the image capture device 100 may be adjusted without repositioning of the coupler 400 from the locked position into the unlocked position. Embodiments in which the coupler 400 may be configured such that the break-torque lies outside the disclosed range are also envisioned herein, however, and would not be beyond the scope of the present disclosure.

To adjust the position of the image capture device 100 and/or remove the image capture device 100 from the accessory 10, the aforedescribed procedure is reversed. More specifically, the coupler 400 is moved from the locked position (FIGS. 4, 5) into the unlocked position (FIG. 6), which alleviates the compressive force applied to the interconnect mechanisms 12 (FIGS. 5, 6, 8), 136 (FIGS. 1B, 4) and allows for tilting of the image capture device 100 in relation to the accessory 10. Thereafter, the coupler 400 can be returned to the locked position, or the coupler 400 can be moved from the engaged position (FIG. 6) into the disengaged position (FIG. 7) to allow for removal of the coupler 400 from the image capture device 100 and the accessory 10 and separation of the image capture device 100 from the accessory 10.

Figures 15, 16:
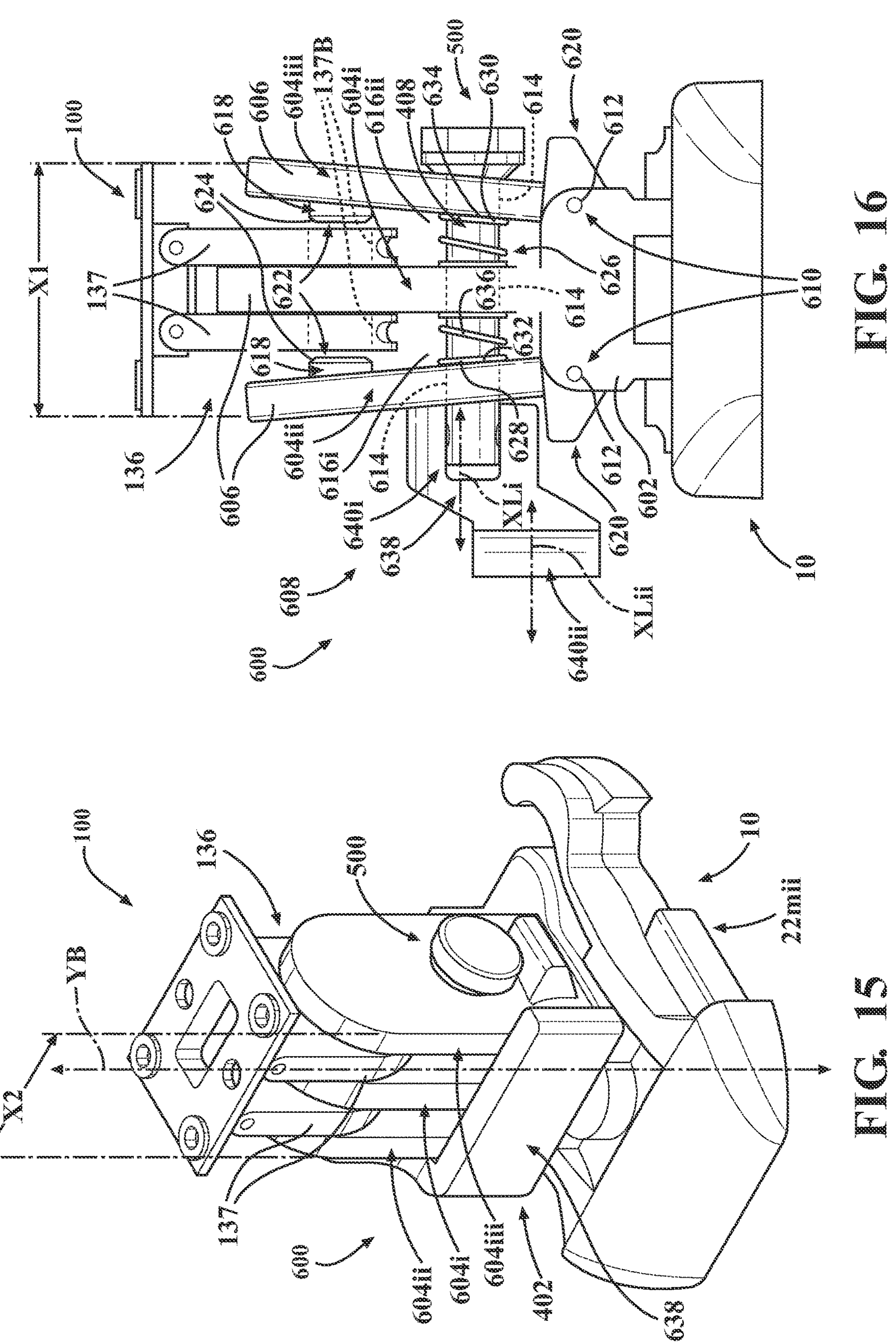
FIG. 15 is an end (e.g., rear), perspective view of an alternate embodiment of the presently disclosed coupler shown connected to the accessory and illustrated in a closed (locked) configuration.
FIG. 16 is an end (e.g., rear), plan view of the coupler and the accessory seen in FIG. 15 with the coupler illustrated in an open (unlocked) configuration.

With reference now to FIGS. 15-17, a coupler 600 will be discussed according to an alternate embodiment of the present disclosure. More specifically, FIG. 15 provides an end (e.g., rear), perspective view of the coupler 600 shown connected to the accessory 10 and illustrated in the closed configuration; FIG. 16 provides an end (e.g., rear), plan view of the coupler 600 and the accessory 10 with the coupler 600 illustrated in the open configuration; FIG. 17 provides an end (e.g., rear), plan view of a coupler 700, which is an alternate embodiment of the coupler 600, shown connected to an alternate embodiment of the accessory 10, which is identified by the reference character 40. Given the similarities between the coupler 400 (FIGS. 4-14), the coupler 600, and the coupler 700, the coupler 600, and the coupler 700 will only be described with respect to any differences from the coupler 400 in the interest of brevity, and identical reference characters will be utilized to identify components common to the coupler 400, the coupler 600, and the coupler 700. As described in detail below, the coupler 600 includes: a base (pedestal) 602; a series of protrusions 604 (e.g., fingers 606) that extend from the base 602; and a closure member 608, which includes the lever 402, the shaft 408, and the end cap 500 discussed above in connection with the coupler 400.

The base 602 is connected to the accessory 10 and extends upwardly therefrom (e.g., towards the image capture device 100) along a (vertical) axis YB. While the base 602 is shown as being integrally (e.g., monolithically, unitarily) formed with the accessory 10 in the particular embodiment illustrated in FIGS. 15 and 16, it is also envisioned that the base 602 may be configured for releasable connection to the accessory 10 (e.g., to facilitate interchange with a variety of accessories 10), whereby the coupler 600 would act as (provide) an intermediate (intervening, connecting) component between the image capture device 100 and the accessory 10. Additionally, while the accessory 10 is again illustrated as the male buckle 22*mii* in FIGS. 15 and 16, as mentioned above, it is envisioned that the particular configuration of the accessory 10 may be varied. For example, with reference to FIG. 17, rather than the male buckle 22*mii*, the accessory 40 includes (is configured as) the aforementioned ball joint, which is identified by the reference character 42.

The protrusions 604 interface (engage) with (connect to) the protrusions 137 on the image capture device 100 and include: a first (stationary) protrusion 604*i*, which is fixedly (non-movably) connected to the base 602, and a pair of (movable) protrusions 604*ii*, 604*iii*, which are located laterally outward of the protrusion 604*i* and are each pivotably connected to the base 602 by a pivot member 610 (e.g., a pin 612). More specifically, in the particular embodiment illustrated in FIGS. 15 and 16, the protrusion 604*i* is integrally (e.g., monolithically, unitarily) formed with the base 602.

The protrusions 604 each include an opening 614 and define channels 616 therebetween. The openings 614 are configured to receive the closure member 608 (e.g., the shaft 408), which is configured to apply an inwardly-directed force to the protrusions 604*ii*, 604*iii* so as to facilitate movement (pivoting) of the protrusions 604*ii*, 604*iii* and, thus, reconfiguration of the coupler 600 between the open (unlocked) configuration (FIG. 16) and the closed (locked) configuration (FIG. 15), as described in further detail below. The channels 616 are configured to receive the protrusions 137 on the image capture device 100 such that the protrusions 137 are received by (positioned within) the channels 616 during connection of the image capture device 100 to the coupler 600, thereby aligning (registering) the protrusions 604 and the protrusions 137. While the coupler 600 is shown as including three protrusions 604*i*, 604*ii*, 604*iii* and two channels 616*i*, 616*ii* in the particular embodiment illustrated, it should be appreciated that the particular numbers of protrusions 604 and channels 616 may be varied in alternate embodiments without departing from the scope of the present disclosure (e.g., depending on the number of protrusions 137 included on the image capture device 100).

The protrusions 604*ii*, 604*iii* each include a detent 618 (or other such projection), which extends laterally inward from the corresponding protrusions 604*ii*, 604*iii* (e.g., towards the protrusion 604*i*), and a wedge member 620, which extends laterally outward from the corresponding protrusions 604*ii*, 604*iii* (e.g., away from the protrusion 604*i*). As such, in the particular embodiment illustrated, the protrusions 604*ii*, 604*iii* are identical (or generally identical) in configuration. Embodiments are also envisioned, however, in which the protrusions 604*ii*, 604*iii* may be non-identical. For example, it is envisioned that the wedge member 620 may be omitted from the protrusion 604*iii*.

The detents 618 are aligned (registered) with the openings 137B (FIG. 16) in the protrusions 137 and are configured for insertion into the openings 137B during reconfiguration of the coupler 600 from the open configuration into the closed configuration. As described in further detail below, upon insertion of the detents 618 into the openings 137B, the protrusions 604*ii*, 604*iii* secure the coupler 600 to the image capture device 100 and, thus, secure the image capture device 100 to the accessory 10. As seen in FIG. 16, the detents 618 each include a tapered end 622, which provides a guide surface 624 that acts as a lead-in to promote proper insertion of the detents 618 into the openings 137B while allowing for minor misalignment therebetween.

The wedge members 620 are fixedly (non-movably) connected to the protrusions 604*ii*, 604*iii* and extend therefrom in transverse (e.g., orthogonal (or generally orthogonal)) relation to the axis YB. More specifically, in the particular embodiment illustrated in FIGS. 15 and 16, the wedge members 620 are integrally (e.g., monolithically, unitarily) formed with the protrusions 604*ii*, 604*iii*. Embodiments are also envisioned, however, in which the wedge members 620 and the protrusions 604*ii*, 604*iii* may be formed as separate components that are fixedly secured together (e.g., via mechanical engagement, via an adhesive, via one or more fasteners, etc.). The wedge members 620 are configured for engagement (contact) with the base 602 to inhibit (if not entirely prevent) rotation (e.g., twisting) of the protrusions 604*ii*, 604*iii* in relation to the base 602 that might otherwise occur during reconfiguration of the coupler 600 between the open and closed configurations.

Referring again to FIG. 17, in certain embodiments, it is envisioned that the wedge member(s) 620 (FIG. 16) may be replaced by a securement member 702 (e.g., a pin, screw, rivet, clip, or other such mechanical connector) that extends through the base 602 and into the shaft 408. The securement member 702 is received by a corresponding slot 456 in the shaft 408, which allows for relative axial translation (movement) between the shaft 408 and the securement member 702 during reconfiguration of the coupler 700 between the open and closed configurations while inhibiting (if not entirely preventing) rotation (e.g., twisting) of the protrusions 604*ii*, 604*iii* in relation to the base 602.

With reference again to FIGS. 15 and 16, in certain embodiments of the disclosure, the coupler 600 may include one or more biasing members 626 that are configured to bias the coupler 600 towards the open configuration. It should be appreciated, however, that the biasing member(s) 626 may be omitted from the coupler 600 without departing from the scope of the present disclosure.

In the particular embodiment illustrated, the coupler 600 includes a single biasing member 626 that is supported by the closure member 608. More specifically, the biasing member 626 is positioned about the shaft 408 of the closure member 608 such that the biasing member 626 extends through the opening 614 in the protrusion 604*i*. The biasing member 626 includes opposing ends 628, 630 that are configured for engagement (contact) with inner surfaces 632, 634 of the protrusions 604*ii*, 604*iii*, respectively, which facilitates the application of an outwardly-directed (biasing) force to the protrusions 604*ii*, 604*iii* (e.g., away from the protrusion 604*i*) and renders the biasing member 626 captive to (e.g., non-removable from) the coupler 600.

Although illustrated as a (coil) spring 636, it should be appreciated that the particular configuration of the biasing member 626 (as well as the number of biasing members 626 and/or the location(s) thereof) may be varied in alternate embodiments without departing from the scope of the present disclosure. For example, embodiments are envisioned in which the biasing member 626 may include a plurality of springs 636, as are embodiments in which the spring(s) 636 may be replaced by one or more compressible bushings (or other such members).

In the particular embodiment of the coupler 600 illustrated in FIGS. 15 and 16, the end cap 500 is shown as being captive (non-removable) and stationary via fixed connection to the protrusion 604*iii*. Embodiments are also envisioned, however, in which the end cap 500 may be rotatable in relation to the shaft 408 and/or removable from the coupler 600. For example, it is envisioned that the end cap 500 and the shaft 408 may be configured for threaded engagement, which would allow for removal of the end cap 500 from the shaft 408 and/or rotation of the end cap 500 in relation to the shaft 408. In such embodiments, it is envisioned that rotatability of the end cap 500 in relation to the shaft 408 may allow for adjustment of the inwardly-directed force that is applied to the protrusions 604*ii*, 604*iii* during reconfiguration of the coupler 600 between the open and closed configurations. Rotatability of the end cap 500 may also be used to account for wear in the end cap 500 and/or the shaft 408 occurring over time as a result of normal use (e.g., via tightening of the end cap 500 to the shaft 408).

The lever 402 includes a handle 638, which facilitates manual manipulation and repositioning of the lever 402 during use of the coupler 600. In contrast to the lever 402 discussed above in connection with the coupler 400 (FIGS. 4-14), the handle 638 includes a (first) section 640*i* that extends along a (first) longitudinal axis XLi and a (second) section 640*ii* that extends along a (second) longitudinal axis XLii. The second section 640*ii* is (vertically) offset from the first section 640*i* along the axis YB defined by the base 602, which increases separation (clearance) between the handle 638 and the interconnect mechanism 136 (e.g., the protrusions 137) on the image capture device 100 during adjustment in the orientation (tilt angle) of the image capture device 100.

With continued reference to FIGS. 15 and 16, use and operation of the coupler 600 will be discussed during connection of the image capture device 100 to the accessory 10. Initially, the coupler 600 is moved from the closed configuration (FIG. 15) into the open configuration (FIG. 16) by pivoting the closure member 608 (e.g., the lever 402) outwardly (e.g., away from the protrusions 604), which is facilitated by the force applied by the biasing member 626. During opening of the coupler 600, the lever 402 moves from the first position into the second position, as discussed above, which enlarges the channels 616 defined between the protrusions 604 on the coupler 600 so as to facilitate insertion of the protrusions 137 on the image capture device 100. Thereafter, once the orientation (e.g., the tilt angle) of the image capture device 100 is varied as desired, the coupler 600 is moved from the open configuration into the closed configuration by pivoting (folding) the closure member 608 inwardly (e.g., towards the protrusions 604), which results in movement of the lever 402 from the second position into the first position. During closure of the coupler 600, force is applied to the protrusions 604*ii*, 604*iii* by the lever 402 (e.g., via the cam members 424 (FIGS. 6, 9, 10)) by virtue of the engagement between the shaft 408 and the end cap 500. The applied force causes the protrusions 604*ii*, 604*iii* to pivot about the pivot members 610 and move laterally inward (e.g., towards the protrusion 604*i*). More specifically, when the coupler 600 is in the open configuration, the protrusions 604*ii*, 604*iii* are separated by a (first) lateral distance X1, and when the coupler 600 is in the closed configuration, the protrusions 604*ii*, 604*iii* are separated by a (second) lateral distance X2, which is less than the lateral distance X1.

Although not illustrated, in certain embodiments of the disclosure, it is envisioned that the coupler 600 may include the aforedescribed bearing member 410 (FIGS. 6, 8, 9) to inhibit (if not entirely prevents) galling (or other such deformation) of the protrusion 604*ii* and increase the surface area over which force is distributed during opening and closure of the coupler 600. In such embodiments, as discussed above in connection with the coupler 400, the bearing member 410 may be positioned between the lever 402 (e.g., the cam member(s) 424 (FIGS. 6, 9, 10)) and the protrusion 604*ii*.

During movement of the coupler 600 into the closed configuration, as the force applied to the protrusions 604*ii*, 604*iii* by the biasing member 626 is overcome, the detents 618 enter the openings 137B (FIG. 16) in the protrusions 137, which securely connects the protrusions 604*ii*, 604*iii* to the protrusions 137 (with the protrusion 604*i* located therebetween). Additionally, closure of the coupler 600 forces the protrusions 604, 137 into frictional engagement (contact), thereby further securing the image capture device 100 in relation to the coupler 600 and, thus, the accessory 10, and fixing the orientation (e.g., the tilt angle) of the image capture device 100.

During closure of the coupler 600, the wedge members 620 engage (contact) the base 602, which resists torquing (rotation) of the protrusions 604*ii*, 604*iii* that might otherwise occur (e.g., as a result of the (vertical) offset between the sections 640*i*, 640*ii* of the handle 638 of the lever 402). Reducing (if not entirely eliminating) torquing of the protrusions 604*ii*, 604*iii* inhibits (if not entirely prevents) misalignment of the detents 618 and the openings 137B (FIG. 16) in the protrusions 137, thereby improving use and operability of the coupler 600.

To adjust the position of the image capture device 100 and/or remove the image capture device 100 from the coupler 600, the aforedescribed procedure is reversed. More specifically, the coupler 600 is moved from the closed configuration into the open configuration. As the coupler 600 moves into the open configuration, the compressive force applied to the protrusions 604, 137 is alleviated, which allows the protrusions 604*ii*, 604*iii* to pivot about the pivot members 610 and move laterally outward (e.g., away from the protrusion 604*i*), which is facilitated by the force applied by the biasing member 626. Outward movement of the protrusions 604*ii*, 604*iii* results in removal of the detents 618 from the openings 137B (FIG. 16) in the protrusions 137, which allows for tilting of the image capture device 100 in relation to the accessory 10 or removal of the protrusions 137 from the channels 616 during separation (detachment) of the image capture device 100 from the coupler 600.

With reference now to FIGS. 18-21, a coupler 800, a coupler 900, a coupler 1000, and a coupler 1000 will be discussed, which are alternate embodiments of the coupler 600. More specifically, FIGS. 18-21 respectively provide end (e.g., front), plan views of the coupler 800, the coupler 900, the coupler 1000, and the coupler 1100, each of which is shown in the open configuration. The coupler 800, the coupler 900, the coupler 1000, and the coupler 1100 are substantially similar to the coupler 600 (FIGS. 15, 16) in both structure and operation and, accordingly, will only be described with respect to any differences therefrom in the interest of brevity. As such, identical reference characters will be utilized to identify components common to the coupler 600, the coupler 800, the coupler 900, the coupler 1000, and the coupler 1100.

With reference to FIG. 18, in addition to the aforementioned base 602 and protrusions 604*i*, 604*ii*, 604*iii*, the coupler 800 includes a closure member 802. In contrast to the coupler 600 (FIGS. 15, 16), the closure member 802 includes a thumb screw 804 with a threaded shaft 806 that extends through the protrusions 604 so as to apply an inwardly-directed closure force and an outwardly-directed opening force thereto at a location (vertically) above the base 602 and the pivot members 610. The protrusions 604 and the closure member 802 are configured for threaded engagement such that rotation of the closure member 802 in a first direction (e.g., clockwise) causes (incremental) opening of the coupler 800 (e.g., separation of the protrusions 604*ii*, 604*iii*) and rotation of the closure member 802 in a second, opposite direction (e.g., counterclockwise) causes (incremental) closure of the coupler 800 (e.g., approximation of the protrusions 604*ii*, 604*iii*) to thereby facilitate reconfiguration of the coupler 800 between the open and closed configurations. The incremental adjustment facilitated by the closure member 802 allows for increased control and adjustability (e.g., relative to the coupler 600 (FIGS. 15, 16)) as well as the (optional) elimination of the biasing member 626 (FIG. 16), which reduces the overall complexity and cost of the coupler 800. It should be appreciated, however, that embodiments of the coupler 800 including the biasing member 626 (e.g., to assist in movement of the coupler 800 into the open configuration in the manner discussed above with respect to the coupler 600) are also envisioned herein and would not be beyond the scope of the present disclosure.

With reference now to FIG. 19, the coupler 900 represents a variation on the coupler 800 (FIG. 18) in which the protrusions 604*ii*, 604*iii* respectively include main body portions 902*ii*, 902*iii* and extensions 904*ii*, 904*iii*, each of which includes an opening 906 that is configured for (threaded) engagement with (reception of) the closure member 802. The extensions 904*ii*, 904*iii* respectively extend from the main body portions 902*ii*, 902*iii* and through the base 602 such that the closure member 802 applies an inwardly-directed closure force and an outwardly-directed opening force to the extensions 904*ii*, 904*iii* at a location (vertically) below the base 602 and the pivot members 610. More specifically, due to the location of the closure member 802 below the pivot members 610, approximation of the extensions 904*ii*, 904*iii* (via rotation of the closure member 802 in the first direction) causes separation of the main body portions 902*ii*, 902*iii* and, thus, disengagement of the protrusions 604*ii*, 604*iii* from the image capture device 100, and separation of the extensions 904*ii*, 904*iii* (via rotation of the closure member 802 in the second direction) causes approximation of the main body portions 902*ii*, 902*iii* and, thus, engagement of the protrusions 604*ii*, 604*iii* with the image capture device 100.

The extensions 904*ii*, 904*iii* are offset from main body portions 902*ii*, 902*iii* such that the protrusions 604*ii*, 604*iii* include respective bends 908*ii*, 908*iii*, each of which defines an identical (or substantially identical) angle 7. Inclusion of the bends 908*ii*, 908*iii* allows for orientation of the openings 906 in parallel (or generally parallel) relation to the closure member 802, which improves the threaded engagement between the protrusions 604*ii*, 604*iii* and the closure member 802.

With reference now to FIG. 20, the coupler 1000 represents a variation on the coupler 900 (FIG. 19) in which the closure member 802 is configured as a chock 1002 that is configured for engagement with the extensions 904*ii*, 904*iii* to facilitate reconfiguration of the coupler 1000 from the open configuration into the closed configuration. The chock 1002 is provided (included) on (or is otherwise connectable to) the accessory 10 (FIG. 15) and includes a tapered configuration that defines (first, outer) bearing surfaces 1004*i*, 1004*ii*. The bearing surfaces 1004*i*, 1004*ii* are configured for engagement (contact) with (second, inner) bearing surfaces 1006*ii*, 1006*iii* respectively defined by the extensions 904*ii*, 904*iii*.

Following connection of the image capture device 100 (FIGS. 4, 15) to the coupler 1000 (e.g., following insertion of the protrusions 137 into the channels 616*i*, 616*ii* defined by the protrusions 604*i*, 604*ii*, 604*iii*), relative movement is caused between the coupler 1000 and the chock 1002 (e.g., via advancement of the coupler 1000 towards the accessory 10, or vice versa) such that the bearing surfaces 1004*i*, 1004*ii* defined by the chock 1002 engages the bearing surfaces 1004*ii*, 1004*iii* defined by the extensions 904*ii*, 904*iii*, respectively. Engagement (and relative (vertical) movement) between the coupler 1000 and the chock 1002 results in the application of force to the extensions 904*ii*, 904*iii* (at a location (vertically) below the pivot members 610). More specifically, as discussed in connection with the coupler 900, due to the application of force below the pivot members 610, separation of the extensions 904*ii*, 904*iii* (via contact with the bearing surfaces 1004*i*, 1004*ii* and relative approximation of the coupler 1000 and the chock 1002) causes approximation of the main body portions 902*ii*, 902*iii* and, thus, engagement of the protrusions 604*ii*, 604*iii* with the image capture device 100.

The tapered configuration of the chock 1002 allows for incremental reconfiguration of the coupler 1000 between the open configuration and the closed configuration, which provides for increased control and adjustability (e.g., relative to the coupler 600 (FIGS. 15, 16)) as well as the (optional) elimination of the biasing member 626 (FIG. 16). It should be appreciated, however, that embodiments of the coupler 1000 including the biasing member 626 (e.g., to assist in movement of the coupler 1000 into the open configuration in the manner discussed above with respect to the coupler 600) are also envisioned herein and would not be beyond the scope of the present disclosure.

With reference to FIG. 21, the coupler 1100 represents a variation on the coupler 800 (FIG. 18), which is configured for use with a chock 1102, which is an alternate embodiment of the chock 1002 (FIG. 20). In contrast to the chock 1002, the chock 1102 is configured for engagement (contact) with outer bearing surfaces 1104*ii*, 1104*iii* respectively defined by the protrusions 604*ii*, 604*iii*. Upon engagement with the protrusions 604*ii*, 604*iii*, the chock 1102 applies an inwardly-directed compressive force to the protrusions 604*ii*, 604*iii* at a location (vertically) above the base 602 and the pivot members 610 to thereby cause approximation of the protrusions 604*ii*, 604*iii* and, thus, closure of the coupler 1100. More specifically, the chock 1102 includes a pair of (vertical) arms 1106, 1108, which collectively define a cavity 1110 that is configured to receive the coupler 1100. The arms 1106, 1108 include inner bearing surfaces 1112, 1114 that are configured for engagement (contact) with the outer bearing surfaces 1104*ii*, 1104*iii* respectively defined by the protrusions 604*ii*, 604*iii*, which allows for incremental reconfiguration of the coupler 1100 between the open configuration and the closed configuration as a result of relative movement between the coupler 1100 and the accessory 10 (e.g., the chock 1102), as described in connection with the coupler 1000 (FIG. 20). As mentioned above, while the incremental adjustability provided by the coupler 1100 allows for the (optional) elimination of the biasing member 626, embodiments of the coupler 1100 including the biasing member 626 (e.g., to assist in movement of the coupler 1100 into the open configuration in the manner discussed above with respect to the coupler 600) are also envisioned herein and would not be beyond the scope of the present disclosure.

Figures 22, 23:
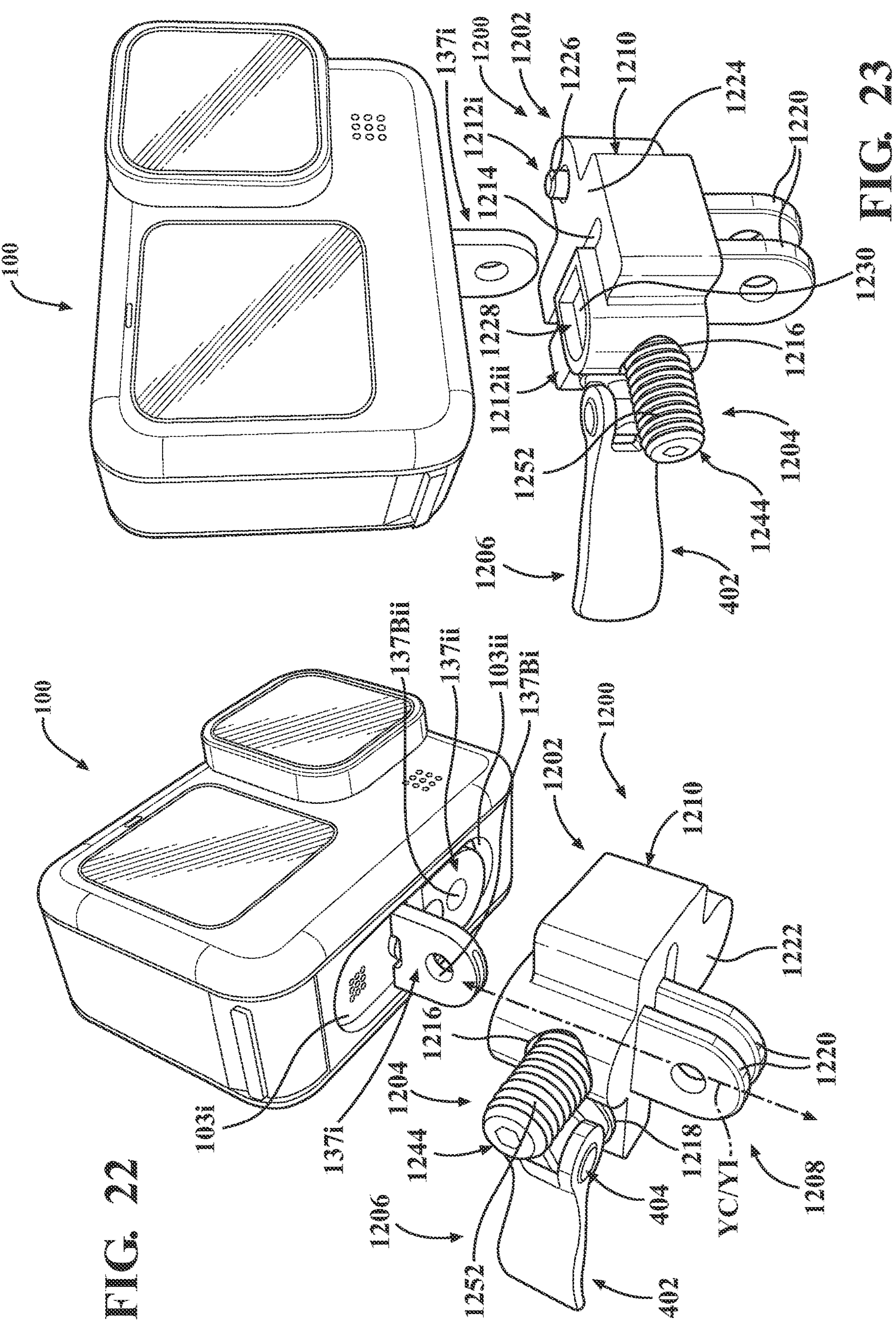
FIG. 22 is a bottom, perspective view of an alternate embodiment of the coupler shown during connection to the image capture device.
FIG. 23 is a top, perspective view of the coupler and the image capture device seen in FIG. 22.
Figures 24, 25:
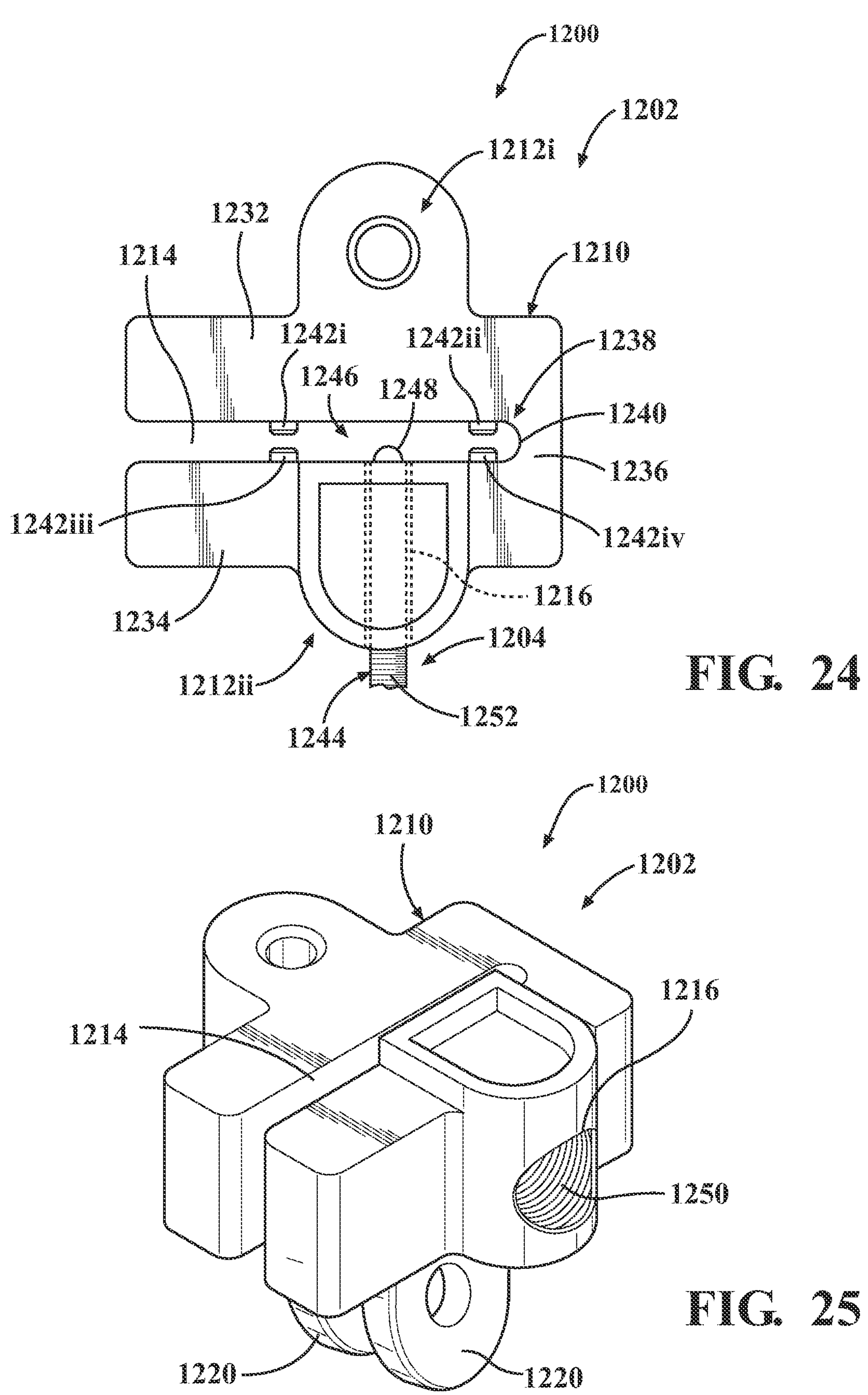
FIG. 24 is a top, plan view of the coupler seen in FIG. 22.
FIG. 25 is a top, perspective view of the coupler seen in FIG. 22.
Figures 26, 27, 28:
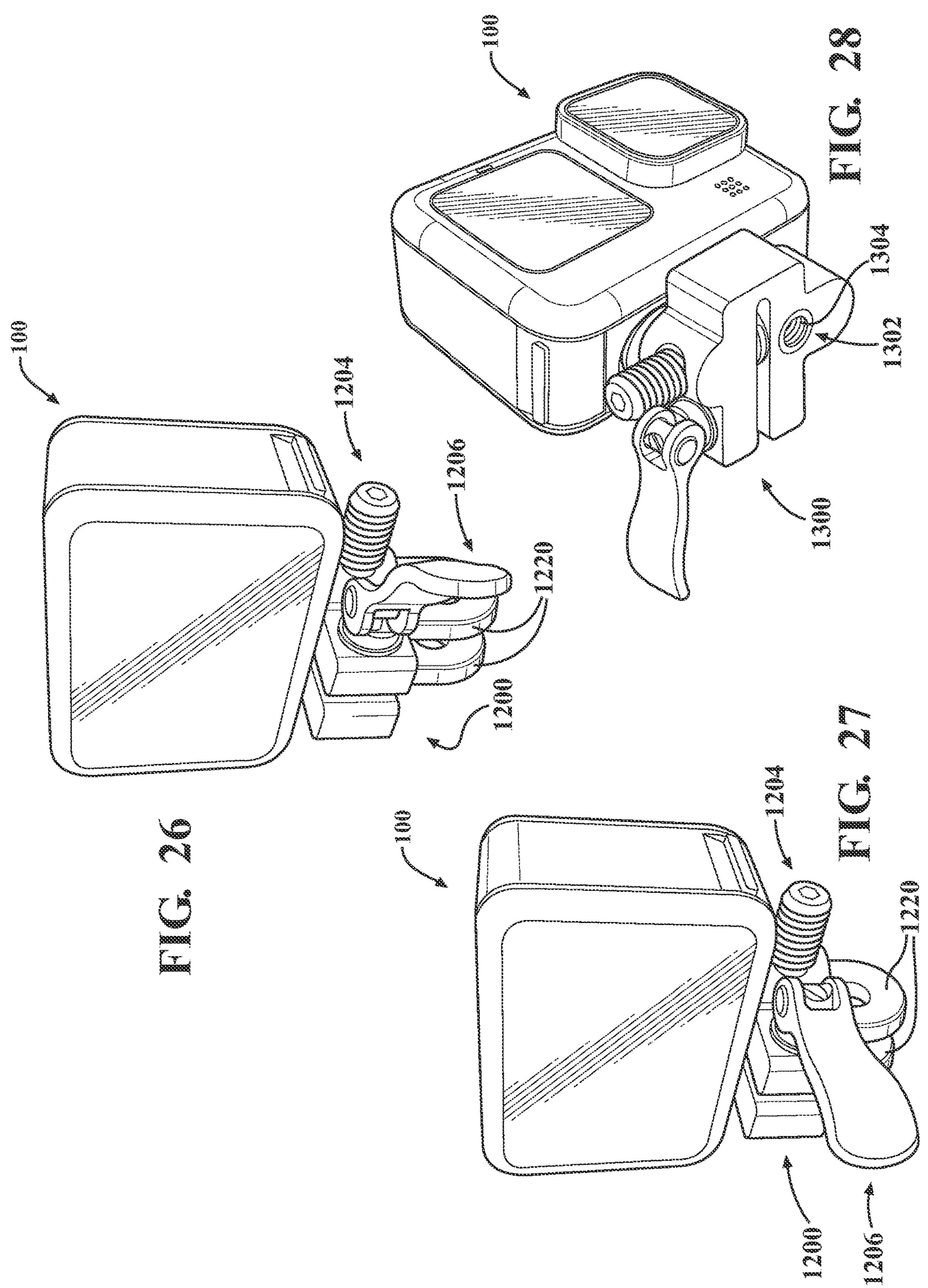
FIG. 26 is an end (e.g., rear), perspective view of the coupler and the image capture device seen in FIG. 22 with the coupler illustrated in an open configuration.
FIG. 27 is an end (e.g., rear), perspective view of the coupler and the image capture device seen in FIG. 22 with the coupler illustrated in a closed configuration.
FIG. 28 is a bottom, perspective view of an alternate embodiment of the coupler shown connected to the image capture device.

With reference now to FIGS. 22-27, a coupler 1200 will be discussed according to an alternate embodiment of the present disclosure. More specifically, FIG. 22 provides a bottom, perspective view of the coupler 1200 shown during connection to the image capture device 100; FIG. 23 provides a top, perspective view of the coupler 1200 shown during connection to the image capture device 100; FIG. 24 provides a top, plan view of the coupler 1200; FIG. 25 provides a top, perspective view of the coupler 1200; FIG. 26 provides an end (e.g., rear), perspective view of the coupler 1200 shown connected to the image capture device 100 with the coupler 1200 illustrated in the open configuration; FIG. 27 provides an end (e.g., rear), perspective view of the coupler 1200 shown connected to the image capture device 100 with the coupler 1200 illustrated in the closed configuration; and FIG. 28 provides a bottom, perspective view of a coupler 1300, which is an alternate embodiment of the coupler 1200, shown connected to the image capture device 100. Given the similarities between the couplers 400 (FIGS. 4-14), 1200, the coupler 1200 will only be described with respect to any differences from the coupler 400 in the interest of brevity, and identical reference characters will be utilized to identify components common to the coupler 400 and the coupler 1200. As described in detail below, the coupler 1200 includes: a clamp plate 1202; a retainer 1204 that extends into the clamp plate 1202; and a closure member 1206, which includes the lever 402, the pivot member 404, and the shaft 408 discussed above in connection with the coupler 400.

The clamp plate 1202 includes: a (third) interconnect mechanism 1208 (FIG. 22) and a body 1210, which supports the closure member 1206 and includes: one or more alignment (registration) members 1212; a channel 1214; a (first) opening 1216 that is configured to receive the retainer 1204; and a (second) opening 1218 (FIG. 22) that is configured to receive the closure member 1206. The clamp plate 1202 (e.g., the body 1210) includes (e.g., is formed partially or entirely from) one or more flexible materials, which facilitates resilient reconfiguration (deformation) of the coupler 1200 between an open (first, initial, undeformed) configuration (FIGS. 22-26), in which the image capture device 100 is insertable into and removable from the coupler 1200, and a closed (second, subsequent, deformed) configuration (FIG. 27), in which the image capture device 100 and the coupler 1200 are secured together. For example, it is envisioned that the clamp plate 1202 may include one or more metallic materials (e.g., aluminum, steel, etc.) and/or one or more non-metallic materials (e.g., one or more plastic materials, polymeric materials, composite materials, etc.).

The interconnect mechanism 1208 is configured for engagement with (connection to) the accessory 10 (FIG. 4) to facilitate repeated connection and disconnection of the image capture device 100 and the accessory 10 via the coupler 1200. In the particular embodiment illustrated, the interconnect mechanism 1208 includes protrusions 1220 that extend (vertically) downward (e.g., away from the image capture device 100) from a lower (bottom) surface 1222 of the body 1210 of the clamp plate 1202 in parallel (or generally parallel) relation to a (vertical) axis YC defined by the coupler 1200. The protrusions 1220 are configured for engagement with the protrusions 14 (FIGS. 5, 6, 8) on the accessory 10 in a manner similar (if not identical) to that described above regarding the protrusions 137 on the image capture device 100 in connection with the coupler 400 (FIGS. 4-14). To increase utility of the coupler 1200, however, is envisioned that the particular configuration of the interconnect mechanism 1208 may be varied in alternate embodiments of the disclosure. For example, instead of the protrusions 1220, the coupler 1300 illustrated in FIG. 28 includes an interconnect mechanism 1302 with a (threaded) insert (receiver) 1304, which facilitates connection of the coupler 1300 to a tripod, for example.

While the coupler 1200 (e.g., the clamp plate 1202) is illustrated as being a separate component discrete from the accessory 10 (FIG. 4), whereby the coupler 1200 acts as an intermediate (intervening, connecting) member (component) between the image capture device 100 and the accessory 10, embodiments are also envisioned in which the coupler 1200 and the accessory 10 may be integrally (e.g., monolithically, unitarily) formed, thereby obviating the need for the interconnect mechanism 1208.

The alignment member(s) 1212 extend (vertically) upward (e.g., towards the image capture device 100) from an upper (top) surface 1224 of the body 1210 of the clamp plate 1202 in parallel (or generally parallel) relation to the axis YC, whereby the upper surface 1224 includes (defines) a non-uniform (e.g., a non-planar, interrupted) configuration. The alignment member(s) 1212 are configured for engagement with the image capture device 100 to not only facilitate proper alignment (registration) of the image capture device 100 and the coupler 1200, but inhibit (if not entirely prevent) relative rotation therebetween subsequent to connection. The alignment member(s) 1212 thus acts as (provide) locations features with anti-rotation (torquing, twisting) capabilities.

In the particular embodiment illustrated, the body 1210 includes a (first) alignment member **1212*i* and a (second) alignment member 1212*ii*. It should be appreciated, however, that embodiments of the coupler 1200 are also envisioned in which the body 1210 may include a single alignment member 1212 only (e.g., either the alignment member 1212*i* or the alignment member 1212*ii***).

The alignment members **1212*i*, 1212*ii* are spaced laterally from each other (e.g., along a reference axis that extends in orthogonal (or generally orthogonal) relation to the axis YC) and include dissimilar (e.g., non-identical) configurations. More specifically, as seen in FIGS. 23-25, the alignment member 1212*i* includes a (first) detent 1226 (or other such protuberance, projection, etc.), which is configured for engagement with the protrusions 137*ii* (in the nested position) via insertion into the opening 137Bii, and the alignment member 1212*ii* includes a block 1228, which is configured for insertion into the cavity 103*i* exposed when the protrusion 137*i* is in the extended position. As such, in the particular embodiment illustrated, the alignment member 1212*i* (e.g., the detent 1226) defines an annular (or generally annular) transverse (e.g., horizontal) cross-sectional configuration, and the alignment member 1212*ii* (e.g., the block 1228) defines a non-annular transverse (e.g., horizontal) cross-sectional configuration that is D-shaped (or generally D-shaped). It should be appreciated, however, that the particular configuration of the block 1228 may be altered in various embodiments without departing from the scope of the present disclosure (e.g., depending upon the particular configurations of the cavities 103 and the protrusions 137**).

While the coupler 1200 is shown as being oriented so as to facilitate insertion of the detent 1226 into the opening 137Bii on the protrusion **137*ii* (when nested) and insertion of the block 1228 into the cavity 103*i*, it should be appreciated that the coupler 1200 is configured for connection to the image capture device 100 in multiple orientations, which simplifies use and operation of coupler 1200. For example, the coupler 1200 may be oriented so as to facilitate insertion of the detent 1226 into the opening 137Bi on the protrusion 137*i* (when nested) and insertion of the block 1228 into the cavity 103*ii*, which allows the lever 402 of the closure member 1206 to be positioned either rearwardly (behind) of the image capture device 100, as seen in FIGS. 22 and 23, or forwardly (in front of) the image capture device 100**.

Additionally, it should be appreciated that the arrangement of the alignment members **1212*i*, 1212*ii* may be reversed in alternate embodiments without departing from the scope of the present disclosure. For example, embodiments are also envisioned herein in which the alignment member 1212*i* may include the block 1228 and the alignment member 1212*ii* may include the detent 1226**.

In the particular embodiment illustrated, the block 1228 includes a relief 1230 (FIG. 23), which reduces the overall weight of the coupler 1200. It should be appreciated, however, that the relief 1230 may be eliminated in alternate embodiments without departing from the scope of the present disclosure.

The channel 1214 extends (axially) through, and laterally into, the body 1210 of the clamp plate 1202 in parallel (or generally parallel) relation to the axis YC (FIG. 22), which imparts a U-shaped (or generally U-shaped) configuration to the body 1210. More specifically, as seen in FIG. 24, the body 1210 includes: a (first) leg 1232; a (second) leg 1234; and a bridge 1236 that extends between (connects) the legs 1232, 1234. The channel 1214 includes an inner end 1238 that terminates in an arcuate (radiused) end wall 1240, which reduces force concentrations and supports (resilient) flexing of the clamp plate 1202 during reconfiguration between of the coupler 1200 between the open and closed configurations. In certain embodiments of the disclosure, to further support flexing of the clamp plate 1202, it is envisioned that the body 1210 may include (define) a hinge member (e.g., a living hinge) that is positioned at (or adjacent to) the inner end 1238 of the channel 1214.

The channel 1214 is configured to receive one of the protrusions 137 on the image capture device 100, when in the extended position, such that the protrusion 137 is received by (extends into) the body 1210 of the clamp plate 1202. Although shown as receiving the protrusion 137*ii* in the particular embodiment illustrated, as indicated above, it should be appreciated that the coupler 1200 is configured for connection to the image capture device 100 in multiple orientations. As such, it is also envisioned that the coupler 1200 may be oriented to receive the protrusion 137*i* instead of the protrusion 137*ii*.

To facilitate proper alignment (registration) and connection of the image capture device 100 and the coupler 1200, in certain embodiments of the disclosure, such as that illustrated, the body 1210 includes one or more guides (stops) 1242. The guide(s) 1242 extend laterally into the channel 1214 and are configured for engagement with the protrusion 137 (e.g., the protrusion 137*ii*) during insertion into the channel 1214. While the coupler 1200 is shown as including two pairs of guides 1242 (e.g., guides 1242*i*, 1242*ii*. 1242*iii*, and 1242*iv*) in the particular embodiment illustrated, it should be appreciated that the particular number of guides 1242 may be varied in alternate embodiments without departing from the scope of the present disclosure. For example, an embodiment including a single pair of guides 1242 is also envisioned herein.

With reference now to FIGS. 24 and 25, the opening 1216 extends into the body 1210 of the clamp plate 1202 such that the opening 1216 is in communication with the channel 1214. More specifically, the opening 1216 is oriented in orthogonal (or generally orthogonal) relation to the channel 1214 and is configured to receive the retainer 1204 such that the retainer 1204 extends into the channel 1214, which facilitates engagement (contact) with the image capture device 100, as described in further detail below.

The retainer 1204 is configured for engagement with the image capture device 100 to facilitate securement of the coupler 1200 thereto. More specifically, the retainer 1204 is configured for removable insertion into the opening 137B in one of the (extended) protrusions 137 (e.g., the opening 137Bii in the protrusion 137*ii*). In the particular embodiment illustrated, the retainer 1204 includes a dowel 1244 and a catch 1246 (FIG. 24) (e.g., a (second) detent 1248, a bearing, etc.) that is supported by the dowel 1244 and which is configured for engagement (contact) with the protrusion 137*ii* (via the opening 137Bii).

In certain embodiments, it is envisioned that the dowel 1244 and the catch 1246 may be integrally (e.g., monolithically, unitarily) formed such that the catch 1246 is fixedly supported by (connected to) the dowel 1244. In such embodiments, the present disclosure contemplates insertion of the catch 1246 into the opening 137Bii via axial advancement of the dowel 1244 through the body 1210 of the clamp plate 1202 and the channel 1214. For example, it is envisioned that the opening 1216 and the dowel 1244 may include corresponding threading 1250, 1252, respectively, which allows for incremental rotation of the dowel 1244 until the catch 1246 is securely received within the opening 137Bii.

Alternatively, it is envisioned that the catch 1246 may be movably supported by the dowel 1244. For example, in the particular embodiment illustrated, the catch 1246 is (spring) biased (towards the channel 1214), which allows for resilient deflection of the catch 1246 (into and out of the dowel 1244) during insertion of the protrusion 137*ii* into the channel 1214 and removal of the protrusion 137*ii* therefrom. More specifically, during insertion of the protrusion 137*ii* into the channel 1214, the retainer 1204 is moved from an initial (first, normal, unbiased) configuration (FIG. 24), in which the catch 1246 protrudes from the dowel 1244, into a subsequent (second, deflected, biased) configuration, in which the catch 1246 is deflected inwardly (retracted) into the dowel 1244. Movement of the retainer 1204 from the initial configuration into the subsequent configuration creates a biasing force, which is directed towards the channel 1214. Upon alignment of the catch 1246 with the opening 137Bii, the biasing force automatically returns the retainer 1204 to the initial configuration, which causes insertion of the catch 1246 into the opening 137Bii, thereby supporting connection of the image capture device 100 and the coupler 1200. Similarly, during removal of the protrusion 137*ii* from the channel 1214, the retainer 1204 is moved from the initial configuration into the subsequent configuration via contact between the catch 1246 and the protrusion 137*ii*, which allows for separation of the image capture device 100 from the coupler 1200. Upon removal of the protrusion 137*ii*, the retainer 1204 is again returned to the initial configuration by the biasing force.

Deflectability of the catch 1246 allows the dowel 1244 to remain (axially) stationary, which simplifies use and operation of the coupler 1200. Embodiments are also envisioned herein, however, in which the dowel 1244 may be repositionable (e.g., rotatable) within the opening 1216, as discussed above, which allows for increased precision in the position of the catch 1246 and adjustability of the retention force applied to the image capture device 100 by the coupler 1200 (e.g., the retainer 1204).

With reference now to FIGS. 22 and 26, the opening 1218 (FIG. 22) extends through the body 1210 of the clamp plate 1202 in orthogonal (or generally orthogonal) relation to the channel 1214 and in parallel (or generally parallel) relation to the opening 1216. The opening 1218 is configured to receive the closure member 1206 such that the closure member 1206 extends between the legs 1232, 1234 (FIG. 24) of the body 1210 (e.g., through the clamp plate 1202), which facilitates the application of an inwardly-directed compressive force to the clamp plate 1202 and, thus, reconfiguration of the coupler 1200 from the open configuration (FIGS. 22, 23, 26) into the closed configuration (FIG. 27) as the closure member 1206 moves from an unlocked position into a locked position. Compression of the clamp plate 1202 forces the legs 1232, 1234 towards each other and into frictional engagement (contact) with the protrusion 137*ii* extending into the channel 1214, thereby fixing the orientation (e.g., the tilt angle) of the image capture device 100 in relation to the coupler 1200 (and the accessory 10) and further supporting connection of the image capture device 100 and the coupler 1200.

In the particular embodiment illustrated, the closure member 1206 is fixedly connected to the leg 1232, which facilitates compression and deformation of the clamp plate 1202 during reconfiguration from the open configuration into the closed configuration via pivoting (folding) of the lever 402 as the closure member 1206 moves from the unlocked position into the locked position. Alternatively, it is envisioned that the closure member 1206 may be connected to the aforementioned end cap 500 (FIG. 5), which may be either fixedly or removably connected thereto in the manner discussed above in connection with the coupler 400 (FIGS. 4-14).

With reference now to FIGS. 24-27, use and operation of the coupler 1200 will be discussed during connection of the image capture device 100 to the accessory 10 (FIG. 4). Initially, the coupler 1200 is moved from the closed configuration (FIG. 27) into the open configuration (FIGS. 22, 23, 26) by (unfolding) pivoting the lever 402 outwardly (e.g., away from the channel 1214), which moves the closure member 1206 from the locked position into the unlocked position. As the coupler 1200 moves into the open configuration, the channel 1214 is enlarged, which facilitates insertion of the protrusion 137*ii* along an axis of insertion YI that extends in parallel (or generally parallel) relation to the axis YC defined by the coupler 1200. As the protrusion 137*ii* enters the channel 1214, the protrusion 137*ii* engages (contacts) the retainer 1204, which displaces the catch 1246 (FIG. 24) inwardly (e.g., away from the channel 1214) and allows for continued advancement of the protrusion 137*i* during movement of the retainer 1204 from the initial configuration into the subsequent configuration. Upon alignment (registration) of the catch 1246 with the opening 137Bii, the retainer 1204 is returned to the initial configuration under the influence of the biasing force, and the catch 1246 is inserted into the opening 137Bii, thereby securing together the image capture device 100 and the coupler 1200. The orientation of the image capture device 100 (relative to the coupler 1200 and the accessory 10) can then be varied as desired (e.g., by changing the tilt angle of the image capture device 100). Following orientation of the image capture device 100 as desired, the closure member 1206 is moved from the unlocked position into the locked position by (folding) pivoting the lever 402 inwardly (e.g., towards the channel 1214), which reconfigures the coupler 1200 from the open configuration (FIGS. 22, 23, 26) into the closed configuration (FIG. 27). During movement of the coupler 1200 into the closed configuration, the closure member 1206 applies an inwardly-directed compressive force to the legs 1232, 1234 (FIG. 24), which deforms and compresses the clamp plate 1202 about the image capture device 100 (e.g., the protrusion 137*ii*). More specifically, movement of the coupler 1200 into the closed configuration causes approximation of the legs 1232, 1234 (e.g., via force applied by the cam member(s) 424 (FIGS. 6, 9, 10)), which causes the legs 1232, 1234 to frictionally engage (contact) the protrusion 137*ii*, thereby fixing the orientation (and the tilt angle) of the image capture device 100 and securing the image capture device to the coupler 1200.

To adjust the position of the image capture device 100 and/or remove the image capture device 100 from the coupler 1200, the aforedescribed procedure is reversed. More specifically, the closure member 1206 is moved from the locked position into the unlocked position by (unfolding) pivoting the lever 402 outwardly (e.g., away from the channel 1214), which reconfigures the coupler 1200 from the closed configuration (FIG. 27) into the open configuration (FIGS. 22, 23, 26). Movement of the coupler 1200 into the open configuration alleviates the compressive force applied to the protrusions 137*ii* by the legs 1232, 1234 (FIG. 24) and allows for tilting of the image capture device 100 in relation to the accessory 10. As the compressive force applied to the protrusion 137*i* decreases, the legs 1232, 1234 flex outwardly (away from each other), which allows for withdrawal of the protrusion 137*ii* from the channel 1214. As the protrusion 137*ii* is withdrawn from the channel 1214 (along the axis YI), the protrusion 137*ii* displaces the catch 1246 (FIG. 24) inwardly (e.g., away from the channel 1214) as the retainer 1204 moves from the initial configuration into the subsequent configuration, which allows for removal of the catch 1246 from the opening 137Bii as the protrusion 137*ii* is withdrawn from the channel 1214. Continued withdrawal of the protrusion 137*ii* separates (detaches) the protrusion 137*ii* from the retainer 1204 and separates (detaches) the image capture device 100 from the coupler 1200. Thereafter, the retainer 1204 is returned to the initial configuration under the influence of the biasing force created during withdrawal of the protrusion 137*ii*.

While the present disclosure has been described in connection with certain embodiments, it is to be understood that the present disclosure is not to be limited to the disclosed embodiments, but, on the contrary, is intended to cover various modifications and equivalent arrangements included within the scope of the appended claims, which scope is to be accorded the broadest interpretation so as to encompass all such modifications and equivalent structures as is permitted under the law.

Persons skilled in the art will understand that the various embodiments of the present disclosure and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the present disclosure, as are alternative embodiments that may result from combining, integrating, and/or omitting features from any of the disclosed embodiments.

Use of the term “optionally” with respect to any element of a claim means that the element may be included or omitted, with both alternatives being within the scope of the claim. Additionally, use of broader terms such as “comprises,” “includes,” and “having” should be understood to provide support for narrower terms such as “consisting of,” “consisting essentially of,” and “comprised substantially of.” Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A coupler configured to releasably connect an image capture device and an accessory, the coupler comprising:

a base;

protrusions extending from the base and configured to engage the image capture device, wherein the protrusions include:

a first protrusion; and second protrusions located laterally outward of the first protrusion and movably connected to the base; and a closure member extending through the protrusions and including:

a shaft;

a lever operatively connected to the shaft such that the coupler is repositionable between:

an open configuration, in which the image capture device is connectable to and disconnectable from the coupler;

a closed configuration, in which the image capture device and the coupler are secured together, wherein the coupler is repositionable between the open configuration and the closed configuration via pivoting of the lever;

a disengaged position, in which the shaft is removable from the image capture device and the coupler; and an engaged position, in which the shaft is non-removable from the image capture device and the coupler, wherein the coupler is repositionable between the disengaged position and the engaged position via concomitant rotation of the lever and the shaft through a range of motion of approximately 90↔; and an end cap configured for releasable engagement with the shaft such, when the coupler is in the disengaged position, the shaft is separable from the end cap, and when the coupler is in the engaged position, the shaft is securely connected to the end cap.

2. The coupler of claim 1, wherein the end cap includes a retention member, and wherein the shaft includes an operative end configured for releasable engagement with retention member.

3. The coupler of claim 2, wherein the operative end of the shaft includes:

first and second channel portions configured to receive the retention member; and first and second receptacles in respective communication with the first and second channel portions, wherein the first and second receptacles are configured to receive the retention member during repositioning of the coupler from the disengaged position into the engaged position.

4. The coupler of claim 3, wherein the first and second channel portions are generally identical and are offset by approximately 180 degrees, and wherein the first and second receptacles are generally identical and are offset by approximately 180 degrees.

5. The coupler of claim 3, wherein the first receptacle extends from the first channel portion in generally orthogonal relation thereto, and wherein the second receptacle extends from the second channel portion in generally orthogonal relation thereto such that the first receptacle and the second receptacle extend in a common circumferential direction.

6. A coupler configured to releasably connect an image capture device and an accessory, the coupler comprising:

a base;

protrusions extending from the base and configured to engage the image capture device, wherein the protrusions include:

a stationary protrusion; and movable protrusions located laterally outward of the stationary protrusion; and a closure member extending through the protrusions and configured to apply an inwardly-directed force thereto to facilitate reconfiguration of the coupler between an open configuration, in which the image capture device is connectable to and disconnectable from the coupler, and a closed configuration, in which the image capture device and the coupler are secured together.

7. The coupler of claim 6, wherein the stationary protrusion is integrally formed with the base.

8. The coupler of claim 6, wherein the movable protrusions are pivotably connected to the base.

9. The coupler of claim 6, further comprising:

pivot members extending through the movable protrusions and into the base.

10. The coupler of claim 6, wherein the protrusions include detents configured for insertion into and removal from the image capture device during repositioning of the coupler between the open configuration and the closed configuration.

11. The coupler of claim 6, further comprising a biasing member configured to bias the coupler towards the open configuration.

12. The coupler of claim 6, wherein the closure member includes:

a shaft; and a lever operatively connected to the shaft to facilitate reconfiguration of the coupler between the open configuration and the closed configuration.

13. The coupler of claim 12, wherein the coupler is reconfigurable between the open configuration and the closed configuration via pivoting of the lever.

14. The coupler of claim 12, wherein the lever is repositionable between a disengaged position, in which the shaft is removable from the image capture device and the coupler, and an engaged position, in which the shaft is non-removable from the image capture device and the coupler.

15. The coupler of claim 14, wherein the coupler is repositionable between the disengaged position and the engaged position via concomitant rotation of the lever and the shaft through a range of motion approximately equal to 90↔.

* * * * *